(12) United States Patent
Sasaki

(10) Patent No.: US 6,545,276 B1
(45) Date of Patent: Apr. 8, 2003

(54) NEAR FIELD OPTICAL MICROSCOPE

(75) Inventor: Hiroko Sasaki, Machida (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/550,255

(22) Filed: Apr. 14, 2000

(30) Foreign Application Priority Data

Apr. 14, 1999 (JP) .......................................... 11-106580
Jan. 6, 2000 (JP) ..................................... 2000-001026

(51) Int. Cl.⁷ .............................................. H01J 31/00
(52) U.S. Cl. ....................... 250/310; 250/306; 250/307; 250/216; 250/458.1; 250/311; 382/130
(58) Field of Search ................................ 250/306, 307, 250/458.1, 234, 216; 382/130

(56) References Cited

U.S. PATENT DOCUMENTS

| | | | |
|---|---|---|---|
| 5,214,282 A | * | 5/1993 | Yamaguchi et al. ......... 250/307 |
| 5,272,330 A | | 12/1993 | Betzig et al. |
| 5,479,024 A | * | 12/1995 | Hillner et al. ........... 250/458.1 |
| 6,144,028 A | * | 11/2000 | Kley .......................... 250/234 |

FOREIGN PATENT DOCUMENTS

| | | |
|---|---|---|
| JP | 62-130302 | 6/1987 |
| JP | 6-137847 | 5/1994 |
| JP | 9-54099 | 2/1997 |
| JP | 10-170522 | 6/1998 |

OTHER PUBLICATIONS

Heinzelmann et al., "Forbidden Light Scanning Near–Field Optical Microscopy",J. Microscopy 177, pp. 115–118, 1995.
N.F. van Hulst et al., "Near–Field Optical Microscope Using A Silicon–Nitride Probe", Appl. Phys. Lett. 62(5), pp. 461–463, 1993.
R. Bachelot et al., "Near–Field Optical Microscope Based on Local Perturbation of a Diffraction Spot", Opt. Lett. 20, pp. 1924–1926, 1995.
U. Ch. Fischer et al., "Observation of Single–Particle Plasmons by Near–Field Optical Microscopy", Phys. Rev. Lett. 62, pp. 458–461, 1989.
Kawata et al., Extended Abstracts, "The 42nd Spring Meeting, 1995", The Japan Society of Applied Physics and Related Societies, No. 3.
Kawata et al., Extended Abstracts, "The 43rd Spring Meeting, 1996", The Japan Society of Applied Physics and Related Societies, No. 3.

* cited by examiner

Primary Examiner—John R. Lee
Assistant Examiner—David A. Vanore
(74) Attorney, Agent, or Firm—Scully, Scott, Murphy & Presser

(57) ABSTRACT

A light illumination portion illuminates light to a sample surface. A probe has a tip which is smaller than the wavelength of light illuminated by the light illumination portion, the tip is provided near the sample surface to which the light is illuminated, and scatters the light. A light detection portion detects light scattered by the probe. A scanning portion relatively scans the sample and the tip of the probe. A near field optical microscope has a constitution such that plasmon resonance is generated during scattering by the probe. Another light illumination portion illuminates light to the surface of a sample. Another probe has a tip provided near to the sample, and the tip of the probe generates scattered light originating in light illuminated by the light illumination portion. Another light detection portion detects light scattered by the probe. An illumination light modulation portion modulates the wavelength of the light illuminated by the light illumination portion at a predetermined frequency. An extraction portion extracts components at the predetermined frequency of the illumination light modulation portion from an output of the light detection portion.

23 Claims, 13 Drawing Sheets

NEAR FIELD OPTICAL MICROSCOPE

CROSS-REFERENCE TO RELATED APPLICATIONS

This application is based upon and claims the benefit of priority from the prior Japanese Patent Applications No. 11-106580, filed Apr. 14, 1999; and No. 2000-001026, filed Jan. 6, 2000, the entire contents of which are incorporated herein by reference.

BACKGROUND OF THE INVENTION

The present invention relates to a near field optical microscope. More particularly this invention relates to a near field optical microscope using scattering probe and a method for observing samples using the near field optical microscope.

Further, this invention relates to a near field optical microscope. More particularly, this invention relates to a near field optical microscope using scattering probe comprising means for improving the S/N of a near field signal when the signal strength changes in accordance with changes in the wavelength of illumination light.

A scanning probe microscope (SPM) is a general term for devices which provide a probe at a field of less than 1 $\mu$m to the surface of a sample, detect the interactive force between the probe and the sample while the probe scans in the XY direction or the XYZ direction, and perform two-dimensional mapping of this relative effect. SPMs of this type include, for example, a scanning tunneling microscope (STM), an atomic force microscope (AFM), a magnetic force microscope (MFM), and a scanning near field optical microscope (SNOM).

Of the above microscopes, the SNOM in particular has been developed since the late 1980s as an optical microscope which has a resolution exceeding the limits of diffraction, and which detects near field light provided close to a sample, for fluorescent light measurement of living body samples, evaluating measuring elements and materials for photonics (evaluation of various characteristics of dielectric photoconducting wave guides, light-generating spectral measurement of semiconductor quantum dots, evaluation of various characteristics of light-generating elements on the surface of a semiconductor, etc.), and the like.

Basically, the SNOM is a microscope which provides a sharp probe near to the sample under illumination light, and detects the state at the position (position of near field) where the light is near to the sample.

U.S. Pat. No. 5,272,300 (Literature 1) appended by Betzig et al. on Dec. 21, 1993, discloses an SNOM which injects light into a sharp-tipped probe, thereby generating a position of local light near a very small aperture in the tip of the probe, and illuminates a very small section of the sample by touching it with the tip of the probe. A light detector is provided below the sample, and detects the light which has permeated the sample, whereby the SNOM performs two-dimensional mapping of the strength of the permeated light.

This SNOM uses a sharp-tipped rod-like probe such as an optical fiber or glass rod, or a crystal probe.

An improved version of this rod-like probe, wherein the areas of the probe other than the tip are coated with a metallic film, is commercially available.

A microscope using this probe has better horizontal resolution than a microscope using a probe which is not coated with a metallic film.

In "J. Microscopy 177 (1995) p. 115" (Literature 2), Heinzelmann et al. disclosed a method for achieving high resolution by providing a movable light detector, determining the scatter angle dependency of the signal, and using a signal of a specific angle.

The most common type of SPM is the AFM, used as a microscope which obtains information relating to the unevenness of the sample surface.

The AFM has a probe supported on the tip of a cantilever, and uses, for example, an optical displacement sensor to detect the displacement of the cantilever in correspondence with forces acting on the probe when the probe is positioned near the surface of the sample, thereby indirectly obtaining information relating to the unevenness of the sample surface.

For example, one such AFM is disclosed in Jpn. Pat. Appln. KOKAI Publication No. 62-130302 (Literature 3).

This AFM uses a method for measuring the unevenness of the sample by detecting the interactive force between the sample and the probe which is also used in other SPM devices. The method is termed regulation, and comprises maintaining a fixed distance between the sample and the probe.

In "Appl. Phys. Lett. 62(5) p. 461 (1993)" (Literature 4), N. F. van Hulst et al. propose a new SNOM which detects optical information of a sample using a silicon nitride cantilever for AFM to measure the unevenness of the sample by AFM measurement.

In this microscope, the sample is provided on an internally all-reflecting prism, and He-Ne laser light is illuminated from all sides of the prism onto the sample, exciting the sample and forming a spot of evanescent light near the surface of the sample.

The probe supported at the tip of the cantilever is inserted into this spot of evanescent light, converting the local waves of evanescent light into propagated waves of scattered light. A portion of this light enters the probe, which comprises silicon nitride and is almost completely permeable by He—Ne laser light, and escapes to the rear side of the cantilever.

This light is condensed by a lens, provided above the cantilever, and illuminated through a pinhole, provided at a position corresponding to the position of the probe with respect to the lens, into a photo multiplier tube which outputs an SNOM signal.

During the SNOM signal detection, an optical displacement detection sensor measures the displacement of the cantilever as in normal AFM measurement, and for example a piezoelectric scanner is controlled by feedback so that the displacement maintains a predetermined constant value.

Therefore, during one scanning process, SNOM measurement is carried out based on the scanning signal and the SNOM signal. In addition, AFM measurement is carried out based on the scanning signal and the feedback control signal.

In an aperture-type SNOM such as that disclosed by Betzig et al., the probe should preferably be coated with metal in order to achieve a high horizontal resolution.

However, it is not easy to uniformly mass-produce metal-coated probes having apertures in their tips. An SNOM demanding ultra high-resolution requires a resolution exceeding the resolution possible when using a normal optical microscope. To achieve this, the diameter of the aperture in the tip of the probe must be less than 0.1 $\mu$m, and preferably less than 0.05 $\mu$m.

It is extremely difficult to manufacture an aperture of such a small diameter with good reproducibility.

The quantity of light illuminated through the aperture into the probe decreases in proportion to the square of the radius of the aperture. Consequently, there is a problematic trade-off, since, when the diameter of the aperture is reduced with the aim of increasing the horizontal resolution of the SNOM image, the quantity of detected light decreases and the S/N ratio of the detection system worsens.

Accordingly, a new SNOM (dispersion mode SNOM) wherein no aperture is provided in the tip of the probe has been proposed. In this SNOM, a highly refractive dielectric having a structure less than the wavelength, or a metal, strongly scatters the near field light.

Since this SNOM does not require an aperture in the tip of the probe, the problem of difficulty in manufacturing the aperture, and the trade-off problem, do not arise.

Kawada et al. disclosed a scattering-type mode SNOM in Jpn. Pat. Appln. KOKAI Publication No. 6-137847 (Literature 5).

In this SNOM, a needle-like probe scatters evanescent light formed onto the surface of the sample, thereby converting it to propagated light. The propagated light, that is, the scattered light is detected by an objective lens and a light detector, which are provided at the side of the probe, and optical information relating to the sample is obtained based on the detected signal.

In "The 42nd Lecture Meeting of the Japanese Federation of Applied Physics" (Preliminary Papers No. 3, p. 916, March 1995) (Literature 6), Kawada et al. disclosed a device in which an STM metal probe is used as the probe. Propagated light is generated when evanescent light, formed on the surface of the sample, is scattered by the tip of the metal probe. The device performs STM observation and SNOM observation by observing this propagated light from the horizontal direction of the sample and the probe, while controlling the distance between the sample and the probe by STM.

Furthermore, in "The 43rd Lecture Meeting of the Japanese Federation of Applied Physics" (Preliminary Papers No. 3, p. 887, March 1996) (Literature 7), Kawata et al. announced that it is possible to perform SNOM observation without using evanescent light. Instead, propagated light is diagonally illuminated onto the sample from thereabove, and scattered in multiplex between the sample and the tip of a metal probe.

In "Opt. Lett. 20 (1995) p. 1924 (Literature 8), Bachelot et al. announced a scattering-type SNOM which does not use an aperture probe, light being propagated from above.

In Jpn. Pat. Appln. KOKAI Publication No. 9-54099 (Literature 9), Toda et al. disclosed a scattering-type SNOM utilizing a suggested field illumination system using a microcantilever for AFM.

In these scattering-type SNOMs, in order to achieve an accurate observation result, it is most important to detect the scattered light efficiently, that is, to obtain an SNOM signal (a near field signal) having a high S/N.

Furthermore, a new SNOM (scattering-type SNOM) using a metal or a highly refractive dielectric having a structure less than the wavelength, to strongly scatter the near field light.

In "Phys. Rev. Lett. 62 (1989) p. 458" (Literature 10), Fischer et al. disclosed an SNOM in which an extremely small metal sphere on a transparent flat face is provided above the sample, and a laser approximately at a plasmon resonance frequency is illuminated from above. Consequently, local plasmon is generated on the metal sphere, and an image is output by using the local plasmon as scattered light.

The scattering efficiency from the tip of the probe is strongly dependent on the wavelength of the light, the material comprising the scattering body, and the size of the scattering body. It is known that the material and size of the scattering body, and the wavelength of the light can improve the scattering efficiency when the light scattered by the probe has generated plasmon resonance.

For example, when light is scattered using a scattering body comprising gold, and assuming that the gold particle resembles a dot, an investigation of the scattering efficiency when the wavelength is altered shows that the peak of 10 nm width where the light wavelength is close to 550 nm.

When light having a wavelength near the peak is used as the illumination light, the scattering efficiency increases, thereby obtaining an S/N higher than when light having other wavelengths is used.

As described above, various types of SNOM have been disclosed. However, they have a disadvantage of picking up scattered light from strong scattering sources other than the probe, and consequently the image S/N deteriorates.

Various ideas for improving the S/N in signal detection using a near field microscope have been proposed as solutions.

The following method is often used to overcome the above problem.

When the probe is vertically oscillated near the surface of the sample, multiplex scattering between the probe and the sample is occurred only when the probe has moved near to the sample. Consequently, the signal at this point oscillated synchronously with the probe oscillation.

By contrast, the scattered light from the scattering source remains constant over time.

A lock-in amplifier extracts the amplitude of a signal strength in synchronism with the number of oscillations of the probe from the signals received by the light detector. In addition, by restraining the strength of the light from the scattering source, it is possible to obtain a signal only from the probe.

Furthermore, in Jpn. Pat. Appln. KOKAI publication No. 10-170522 (Literature 11), Sasaki discloses an idea applying hetrodine in combination with the above method for detecting near field microscope signals.

In a scattering-type SNOM, solving the disadvantage of picking up scattered light from strong scattering sources other than the probe, whereby the image S/N deteriorates, is an extremely important second problem.

BRIEF SUMMARY OF THE INVENTION

It is an object of this invention to provide a solve the first problem mentioned above by providing a scanning near field optical microscope which is capable of detecting near field signal with superior S/N, and a method for observing a sample using the near field optical microscope.

It is another object of this invention to solve the second problem mentioned above by providing a near field optical microscope comprising signal detection means which applies modulation to a signal from a signal by modulating the wavelength of the illumination light, and extracts a SNOM signal from the modulated signal, thereby obtaining an image having good S/N.

In order to solve the first problem mentioned above, a first aspect of this invention provides a near field optical microscope comprising:

a light illumination portion which illuminates light to the surface of a sample;

a probe having a tip smaller than the wavelength of light illuminated by the light illumination portion, the tip being provided near the sample surface to which the light is illuminated, and scattering the light;

a light detection portion which detects light scattered by the probe; and a scanning portion which relatively scans the sample and the tip of the probe, wherein plasmon resonance is generated during scattering by the probe.

In order to solve the first problem mentioned above, a second aspect of this invention provides a near field optical microscope comprising:

a light illumination portion which illuminates light to the surface of a sample;

a probe having a tip smaller than the wavelength of light illuminated by the light illumination portion, the tip being provided near the sample surface to which the light is illuminated, and scattering the light;

a light detection portion which detects light scattered by the probe; and a scanning portion which relatively scans the sample and the tip of the probe, wherein conditions comprising the wavelength of the light illuminated by the light illumination portion, the refractive index of the tip of the probe, and the size of the tip of the probe, are conditions which generate the plasmon resonance during scattering by the probe.

In order to solve the first problem mentioned above, a third aspect of this invention provides a method for observing a sample using a near field optical microscope comprising the steps of:

relatively scanning a sample, and a probe having a tip provided at a position near a surface of the sample;

illuminating light to the tip of the probe, and scattering the light; and detecting scattered light which is scattered by the tip of the probe, wherein plasmon resonance is generated during scattering by the probe.

In order to solve the second problem mentioned above, a fourth aspect of this invention provides a near field optical microscope comprising:

a light illumination portion which illuminates light to the surface of a sample;

a probe having a tip provided near to the sample, the tip of the probe generating scattered light originating in light illuminated by the light illumination portion;

a light detection portion which detects light scattered by the probe;

an illumination light modulation portion which modulates the wavelength of the light illuminated by the light illumination portion at a predetermined frequency; and an extraction portion which extracts components at the predetermined frequency of the illumination light modulation portion from an output of the light detection portion.

In order to solve the second problem mentioned above, a fifth aspect of this invention provides a near field optical microscope comprising:

a light illumination portion which illuminates light to the surface of a sample;

a probe having a tip provided near to the sample, the tip of the probe generating scattered light originating in light illuminated by the light illumination portion;

a light detection portion which detects light scattered by the probe;

an illumination light modulation portion which modulates the wavelength of the light illuminated by the light illumination portion at a first frequency;

a probe oscillation portion which oscillates the probe at a second frequency; and an extraction portion which extracts a beat frequency component of the first frequency of the illumination light modulation portion and the second frequency of the probe oscillation portion from an output of the light detection portion.

In order to solve the second problem mentioned above, a sixth aspect of this invention provides a near field optical microscope comprising:

a light illumination portion which illuminates light to the surface of a sample;

a probe having a tip provided near to the sample, the tip of the probe generating scattered light originating in light illuminated by the light illumination portion;

a light detection portion which detects light scattered by the probe;

an illumination light modulation portion which modulates the wavelength of the light illuminated by the light illumination portion at a first frequency;

a coherence portion which makes a reference light, at a frequency differing only by a frequency $\delta$ from the scattered light generated by the probe, coherent with the scattered light; and an extraction portion which extracts a beat frequency component of the first frequency of the illumination light modulation portion and the frequency $\delta$ of the coherence portion from an output of the light detection portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION (First Embodiment)

A scattering-type scanning near field optical microscope according to a first embodiment of the present invention will be explained with reference to the accompanying drawings.

Figure 1:
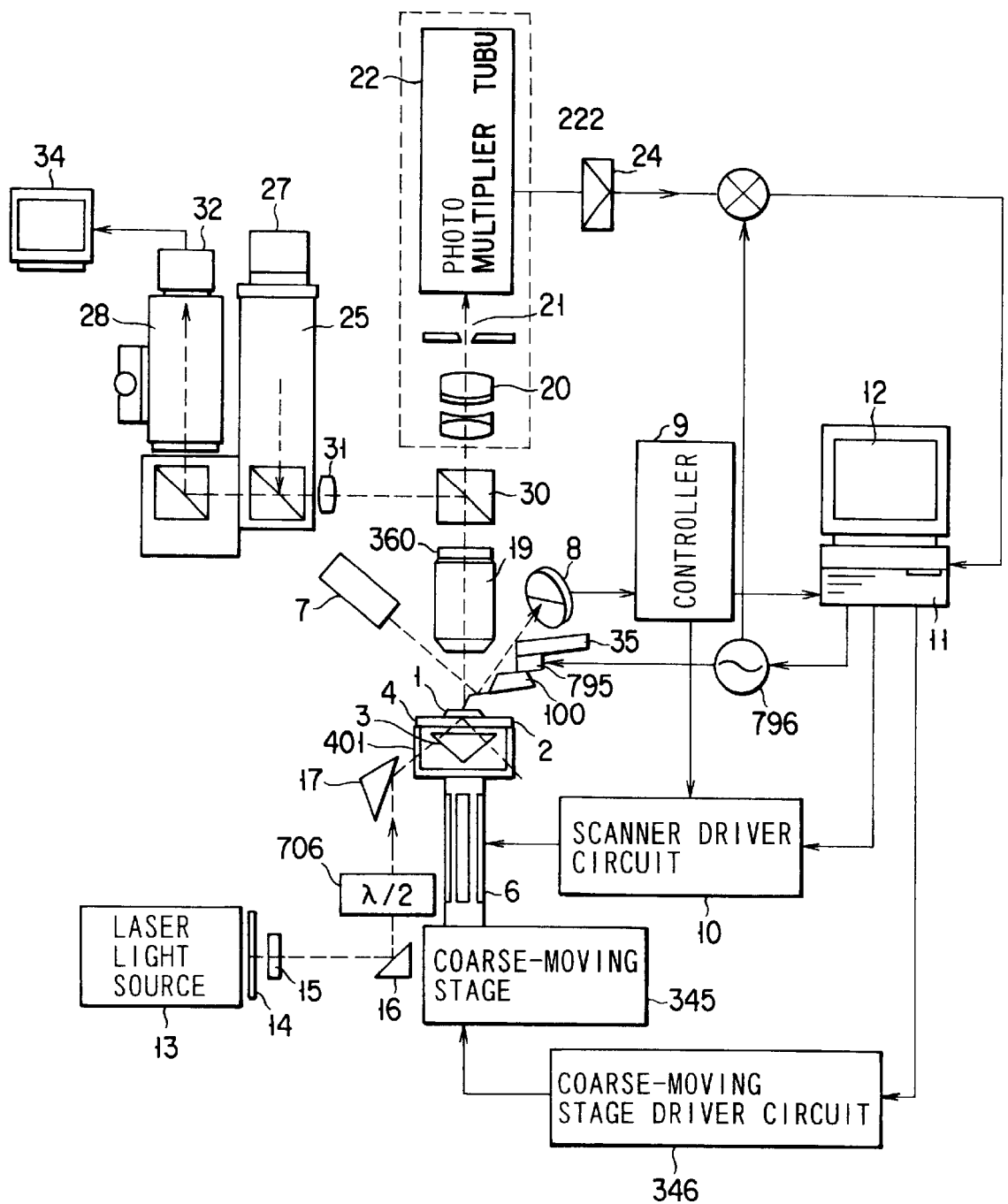
FIG. 1 is a diagram schematically showing a constitution of an entire scattering-type scanning near field optical microscope according to a first embodiment of the present invention.

As shown in FIG. 1, this scattering-type scanning near field optical microscope has a transparent silicon nitride cantilever chip 100 provided above a sample 1.

Figure 2:
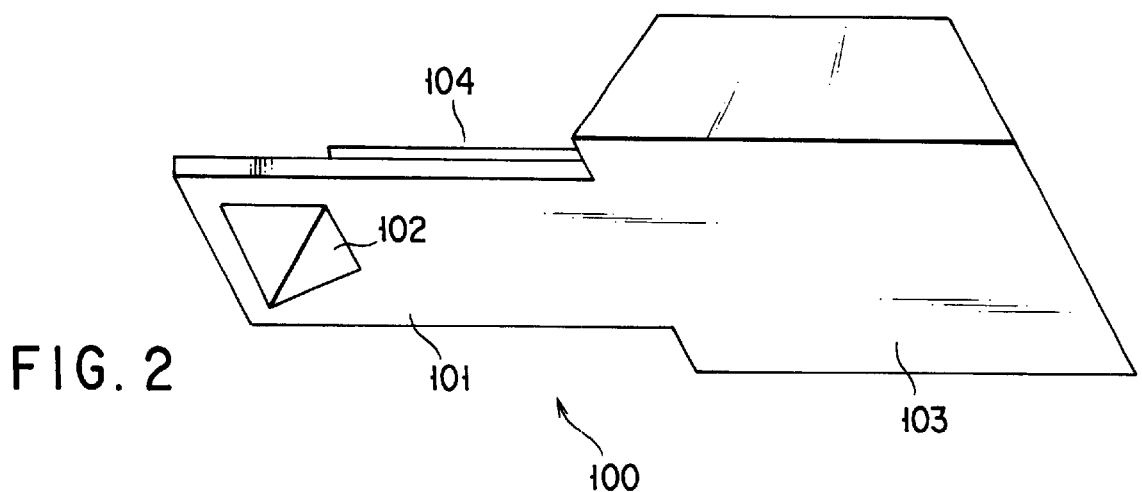
FIG. 2 is a perspective view of a cantilever used in the scanning near field optical microscope of FIG. 1.

As shown in FIG. 2, the cantilever chip 100 comprises a supporting section 103, a cantilever 101 extending from the supporting section 103, and a probe 102 having pyramid-like sharp tip, provided at the tip of the cantilever 101.

The diameter of the tip of the probe 102 is shorter than the wavelength of illumination light (explained later). The tip of the probe 102 functions as a scattering body.

The probe 102 comprises a metal or a dielectric having a high refractive index, or is coated by these materials.

The rear face of the cantilever 101 (the face on the side opposite to the face which the probe 102 is provided on) is coated with a highly reflective aluminium film 104.

The portions near the probe 102 of the cantilever 101 should preferably be transparent to illumination light, and to light used to form an image, so that the light can be easily illuminated to the probe 102.

The radius of the tip of the probe 102 requires only to be shorter than the wavelength of the illumination light. The length from the tip of the probe 102 to the cantilever 101 (that is, the height of the pyramid), and the sides of the contact face which touches the cantilever 101 (that is, the bottom face of the pyramid) need only be longer than the wavelength.

Therefore, the probe provided at the tip of the cantilever 101 is not limited to the pyramidal probe 102 shown in FIG. 2. Provided that the radius of its tip is shorter than the wavelength of the illumination light, any shape is acceptable.

Figure 3:
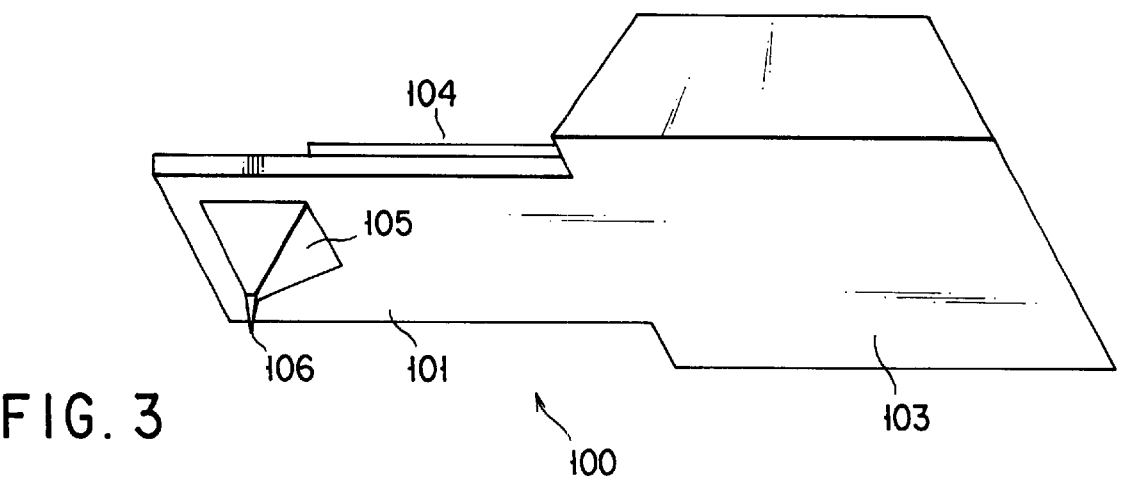
FIG. 3 is a perspective view of another cantilever which can be used in the scanning near field optical microscope of FIG. 1.

For example, as shown in FIG. 3, the probe may comprise a pyramidal probe base 105, and a scattering body (probe tip) 106 provided on the tip thereof. The scattering body 106 is smaller than the wavelength of the illumination light, and comprises a metal or a dielectric having a high refractive index.

The probe base 105 and a portion of the cantilever 101 should be transparent to illumination light, and to light used to form an image, so that the light can be easily illuminated to the probe scattering body 106.

In an alternative arrangement, as shown in FIGS. 4A to 4D, a probe base 107 has a bottom face comprising a flat face or a convex curved face, and a scattering body (probe tip) 108, comprising a metal or a dielectric having a high refractive index and smaller than the wavelength, is provided on the bottom face of the probe base 107.

The probe base 107 and a portion of the cantilever 101 should be transparent to illumination light, and to light used to form an image, so that the light can be easily illuminated to the probe scattering body 108.

Unless otherwise stated, the following explanation refers to a constitution wherein the probe 102 shown in FIG. 2 is used representatively as the cantilever chip 100.

As shown in FIG. 1, the cantilever chip 100 is supported above the sample 1 by a chip holder 35, with an ultrasonic wave vibrator 795 therebetween.

High-frequency oscillator 796 drives the ultrasonic wave vibrator 795, comprising light amplitude modulation means, which excites the cantilever chip 100 at a frequency $\omega 1$ of the high-frequency oscillator 796.

This device has an optical displacement sensor which detects displacement of the free end of the cantilever 101. The displacement sensor comprises a semiconductor laser 7 which illuminates light to the cantilever 101, and a bisected light detector 8 which receives light reflected from the cantilever 101.

The light from the semiconductor laser 7 is illuminated to the cantilever 101, from where it is reflected by the aluminium film 104 on the rear face of the cantilever 101, and illuminated into the bisectional light detector 8.

The displacement of the free end of the cantilever 101 changes the position at which the reflected light enters the bisectional light detector 8. As a consequence, the output ratios of the light-receiving sections of the bisectional light detector 8 fluctuate.

Therefore, by determining the difference in the outputs of the light-receiving sections of the bisectional light detector 8, the displacement of the free end of the cantilever 101 can be determined, whereby the displacement of the probe 102 can be determined indirectly.

Figure 5:
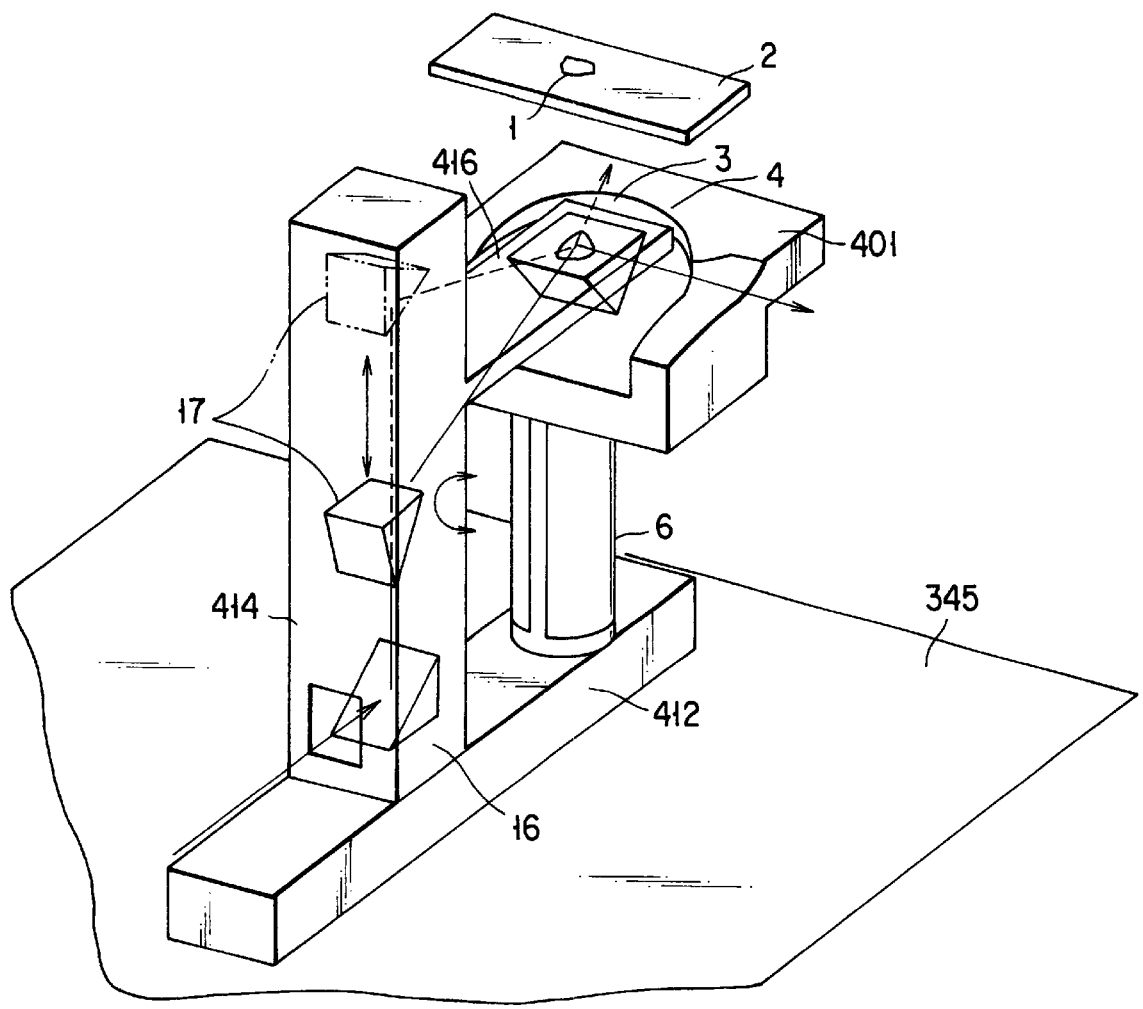
FIG. 5 is a perspective view of a peripheral structure of the internal all-reflecting prism shown in FIG. 1.

As shown in FIG. 5, a piezoelectric tube scanner 6 is secured on a base 412, and a sample table 401 is secured on the top end of the piezoelectric tube scanner 6.

A supporting section 414 is provided on the end of the base 412, and a horizontally extending arm 416 is provided on the supporting section 414.

An internally fully-reflecting prism 3 is secured at the tip of the arm 416, and is provided in a space in the sample table 401 while being exposed by an aperture in the center of the top face of the sample table 401.

The sample 1 is provided on a slide glass 2. An appropriate amount of matching oil 4 is applied to the top face of the internally fully-reflecting prism 3, and the slide glass 2 is provided on the sample table 401.

As a result, as shown in FIG. 1, the matching oil is provided between the slide glass 2 and the internally fully-reflecting prism 3, thereby optically joining one to the other.

As shown schematically in FIG. 1, the structure of FIG. 5 is provided on a coarse-moving stage 345.

A coarse-moving stage driver circuit 346 is controlled by a computer 11, and drives the coarse-moving stage 345 so that the structure of FIG. 5 moves coarsely in three dimensions.

As a consequence, the sample 1 and the probe 102 are positioned broadly with respect to each other, and the distance therebetween is coarsely adjusted.

In FIG. 1, a scanner driver 10, which is controlled by a controller 9 and the computer 11, drives the piezoelectric tube scanner 6, moving the sample table 401 in three dimensions.

Consequently, the sample 1 on the slide glass 2. provided on the sample table 401 moves in three dimensions relative to the probe 102.

Therefore, the probe 102 scans across the surface of the sample 1, and the distance between the tip of the sample 1 and the surface of the probe 102 is minutely adjusted.

In the present application, the scanning of the probe across the sample surface is expressed as XY scanning, and the adjustment of the distance between the probe tip and the sample surface is expressed as Z controlling.

As described above with reference to FIG. 5, the arm 416 supports the internally fully-reflecting prism 3 independent of the sample table 401. Therefore, during scanning, the internally fully-reflecting prism 3 remains immobile without being affected by the movement of the sample table 401.

The present microscope comprises light-generating means which generates light between the probe and the sample.

The light-generating means comprises a local light generating means for generating local light which is not propagated, and a propagated light generating means for generating propagated light. Either of the two types of light is selected in accordance with various characteristics of the sample, such as its thickness and material.

Local light signifies light which is not propagated in space, such as, for example, evanescent light.

Propagated light signifies light which is propagated in space, such as, for example, normal light.

The local light generating means and the propagated light generating means will be explained in detail.

In the present case, the local light generating means is particularly an evanescent light generating means, and in FIG. 1 this section comprises a laser light source 13, a filter 14, a lens 15, two mirrors 16 and 17, and the internally fully-reflecting prism 3.

A rotating drive system (not shown in the diagram) supports the mirror 17 in two postures (positions and directions) represented by a solid line and an imaginary (broken) line in FIG. 5. Here, the mirror 17 is provided in the posture shown by the solid line.

The laser light illuminated from the laser light source 13 passes through the filter 14, and is converted by the lens 15 to a parallel beam.

The parallel laser beam is reflected by the mirrors 16 and 17 in that order, and is fully reflected by the top face of the internally fully-reflecting prism 3 (that is, the interface between the slide glass 2 and the sample 1, or the atmospheric interface with the sample 1.

As a result, evanescent light is generated near the surface of the sample 1.

When necessary, a lens for focusing the parallel beam may be provided between the mirror 17 and the internally fully-reflecting prism 3.

A rotatable half-wavelength plate 706 may be provided on the light path of the parallel laser beam.

The half-wavelength plate 706 rotates, thereby changing the polarization direction of the parallel laser beam.

In FIG. 1, the propagated light generating means comprises the laser light source 13, the filter 14, the lens 15, and the two mirrors 16 and 17.

As described above, a rotating drive system (not shown in the diagram) supports the mirror 17 in two postures (positions and directions) represented by a solid line and an imaginary (broken) line in FIG. 5. Here, the mirror 17 is provided in the posture shown by the imaginary line.

The laser light illuminated from the laser light source 13 passes through the filter 14, and is converted by the lens 15 to a parallel beam.

Figure 6:
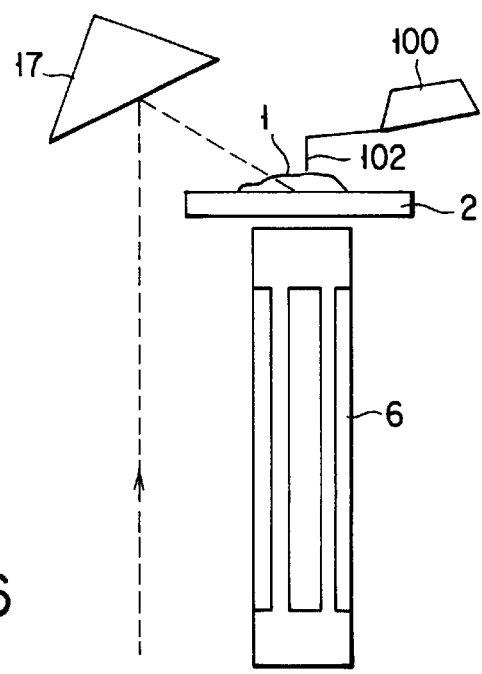
FIG. 6 is a diagram showing a state when a parallel laser beam is illuminated as propagated light diagonally downwards onto a sample.

The parallel laser beam is reflected by the mirrors 16 and 17 in that order, and is illuminated diagonally from above the sample 1 to the area near the sample 1 and the probe 102, as shown in FIG. 6.

The propagated light generating means may comprise an optical system using a suggested field illumination system, such as that disclosed in Japanese Patent Application No. 8-141752.

As shown in FIG. 1, an objective lens 19 is provided above the internally fully-reflecting prism 3, between the sample 1 and the probe 102.

A scattered light detection observation tube 222 is provided above the objective lens 19, and functions in combination with the objective lens 19 to form an optical system for detecting scattered light.

An optical system for detecting scattered light detects scattered light generated when a probe is inserted into local light comprising evanescent light.

The scattered light detection observation tube 222 comprises a lens group 20, a pinhole 21, and a photo multiplier tube 22.

The pinhole 21 is provided in a position with respect to the objective lens 19 and the lens group 20 so that it functions optically together with the tip of the probe 102. As a result, the optical system for detecting scattered light has a conjugate point.

Therefore, most of the light illuminated to the photo multiplier tube 22 is scattered light generated near the tip of the probe 102.

Since the optical system for detecting scattered light has a conjugate point, the scattered light generated near the tip of the probe 102 can be detected efficiently.

The photo multiplier tube 22 connects to a high-pressure power for photo multiplier tube 23, and outputs an electrical signal in correspondence with the optical strength of the scattered light it receives.

The signal output from the photo multiplier tube 22 is amplified by an amplifier 24, and supplied to the computer 11 as an SNOM signal (near field signal).

Instead of the pinhole 21 in the scattered light detection observation tube 222, the optical system for detecting scattered light may comprise an optical fiber having a side face provided at the pinhole position. The optical fiber guides light illuminated from the side face to the photo multiplier tube 22, thereby achieving the same effect.

In this constitution, the scattered light propagates through the optical fiber to the photo multiplier tube 22. Therefore, the photo multiplier tube 22 need not be provided inside the scattered light detection observation tube 222, but may alternatively be provided at a predetermined position outside the scattered light detection observation tube 222.

In FIG. 1, cantilever chip 100 is provided in a position such that the projected image on the top face of the prism 3 of the long axis of the cantilever 101 is parallel to the projected image on the top face of the prism 3 of the light which is illuminated thereto.

However, when the cantilever chip 100 is capable of detecting scattered light which is strongly generated in the direction of the parallel laser beam as a result of Mie scattering generated by inserting the probe 102 into the evanescent light, the cantilever chip 100 may be provided facing any direction.

In particular, when the two projected images mentioned above intersect each other, the strongly generated scattered light can be detected with high efficiency, and scattered light can be detected at a high S/N.

The present invention comprises a microscope binocular 28 and a microscope illuminator 25, which are both optically coupled to the objective lens 19 by a half-mirror prism 30 provided above the objective lens 19. The microscope binocular 28 functions in combination with the objective lens 19 to form an optical microscope, and the microscope illuminator 25 functions in combination with the objective lens 19 to form an illumination optical system.

The optical microscope is used for various methods of optically observing the sample 1. In addition, it is used for identifying an observation point of the sample 1, positioning the probe 102 at the observation point, and confirming the position at which the displacement sensor illuminates laser light to the cantilever 101.

Another device which is capable of identifying an observation point, and confirming the position at which the displacement sensor illuminates, such as a laser light stereoscope, a loupe, and an electron microscope, may be used instead.

A CCD camera 32 is attached to the microscope binocular 28, and extracts an image therefrom. The image captured by the CCD camera 32 is transmitted by CCD camera control means 33, and displayed on a monitor television 34.

An optical fiber 26 connects the microscope illuminator 25 to an illuminated light source 27.

The illuminated light generated by the illuminated light source 27 is illuminated via the optical fiber 26, the microscope illuminator 25, a lens 31, the half-mirror prism 30, and the objective lens 19, to the sample 1.

The light from the sample 1 is sent via the objective lens 19, the half-mirror prism 30, the lens 31, a half-mirror prism 370, a mirror prism 371, and illuminated into the microscope binocular 28, thereby forming an image on the light-receiving face of the CCD camera 32.

The image captured by the CCD camera 32 is displayed on the monitor television 34.

In this device, AFM measurement is carried out simultaneously with the SNOM measurement.

That is, SNOM data and AFM data are both captured during one scanning process.

There are various modes of AFM measurement, depending on the Z control between the tip of the probe and the sample surface.

For example, in a dynamic mode, the cantilever is oscillated very slightly so that the probe oscillates at a right angle to the sample surface. In a contact mode, the cantilever is supported in a static posture, and the probe makes contact with the sample.

In the dynamic mode, an ultrasonic vibrator 795 is used to vibrate the cantilever chip 100 so that the probe 102, provided at the tip of the cantilever 101, oscillates at a right angle to the surface of the sample 1, its oscillations having a constant amplitude.

The oscillation amplitude of the probe 102 attenuates when it is provided sufficiently near to the surface of the sample 1 (i.e. at a distance where the atomic force becomes active).

The probe 102 is Z-controlled (i.e. the distance between the probe and the sample is controlled) so that the probe 102 maintains a constant attenuated oscillation amplitude while it scans in the XY direction.

On the other hand, in the contact mode, the probe 102 is provided sufficiently near to the surface of the sample 1 (i.e. to a distance where the atomic force becomes active), or is provided so as to make contact with the surface of the sample 1.

The attractive force and repulsive force generated by the sample and the probe elastically changes the shape of the cantilever 101, displacing the probe 102 in the Z direction.

The probe 102 is Z-controlled (i.e. the distance between the probe and the sample surface is controlled) so that its displacement remains constant while it scans in the XY direction.

While the probe 102 is scanning across the sample surface, the distance between the probe and the sample surface is Z-controlled.

This Z-control is accomplished by using a controller 9 to create a control signal relating to a position in the Z direction in accordance with a signal from the displacement sensor, and controlling the piezoelectric tube scanner 6 based on this control signal.

During the scanning, the computer 11 captures the control signal from the controller 9 for Z-control as AFM data, and processes the AFM data together with an XY scanning signal created in the computer 11.

As a consequence, an AFM image expressing the unevenness of the sample surface is formed.

Furthermore, during the scanning, the photo multiplier tube 22 outputs a signal as SNOM data (near field data) to the computer 11, which processes the SNOM data together with the XY scanning signal created in the computer 11.

As a consequence, an SNOM image expressing optical data of the sample surface is formed.

The AFM image and the SNOM image are displayed together on a monitor 12.

In the dynamic mode, it is also possible to form an image of the amplitude of the strength of scattered light by means of a lock-in amplifier in which a received scattered light strength signal is synchronized with the oscillation of the cantilever.

Figure 7:
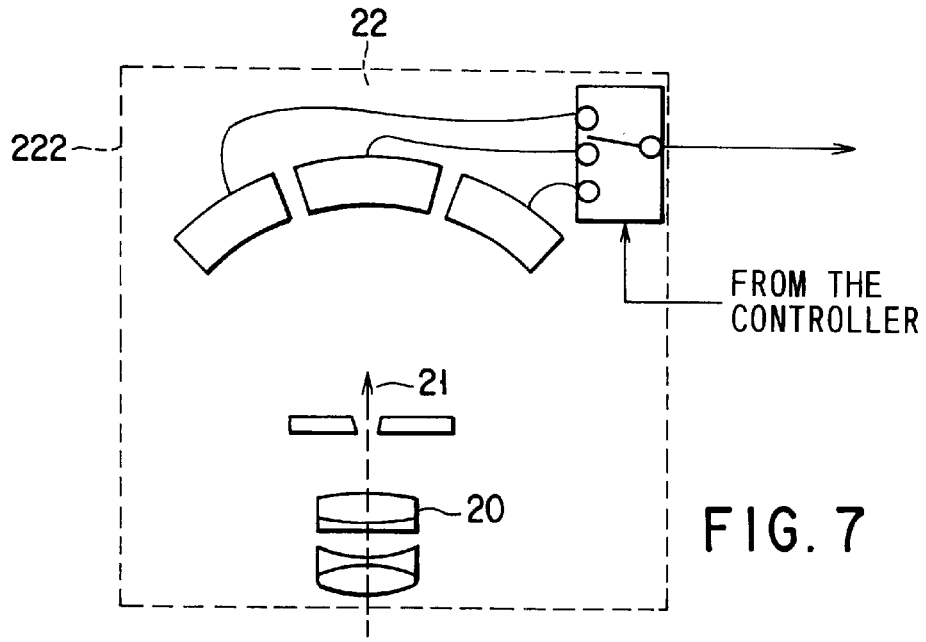
FIG. 7 is a diagram showing an example of a constitution of a scattered light detection observation tube used to obtain an angle-dependent enhanced image.

Furthermore, as shown in FIG. 7, by detecting signals of multiple angle components, calculating these in the computer, and creating an image based on the calculated result, it is possible to obtain an angle-dependent enhanced image.

As described above, light is illuminated onto the sample surface by the light-generating section, and is scattered by the probe 102.

Figure 4:
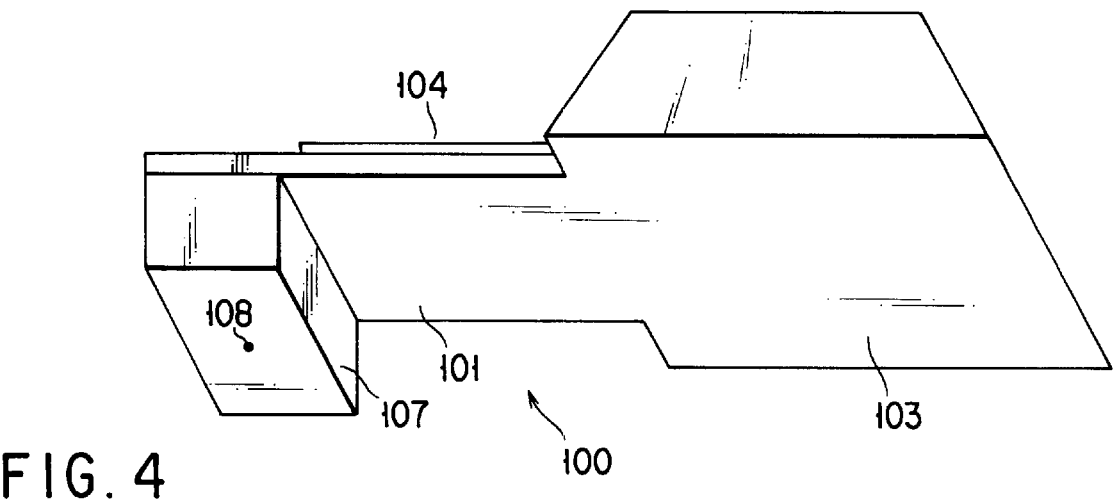
FIG. 4 is a perspective view of yet another cantilever which can be used in the scanning near field optical microscope of FIG. 1.

More accurately, the light is scattered by the tip of the probe 102 of the cantilever chip 100 shown in FIG. 2, or by the scattering bodies 106 and 108 provided at the tip of the probe bases 105 and 107 of the cantilever chips 100 shown in FIGS. 3 and 4 respectively.

For reasons of simplification, in the following explanation, the tip of the probe 102 and the scattering bodies 106 and 108, which function as scattering bodies, will be referred to generically as "scattering bodies".

In practice, this scattering can be regarded as Mie scattering, its strength efficiency being largely dependent on the size and refractive index of the scattering bodies, and the wavelength of the illumination light.

This will be explained taking as an example a scattering body comprising a gold particle.

Figure 8:
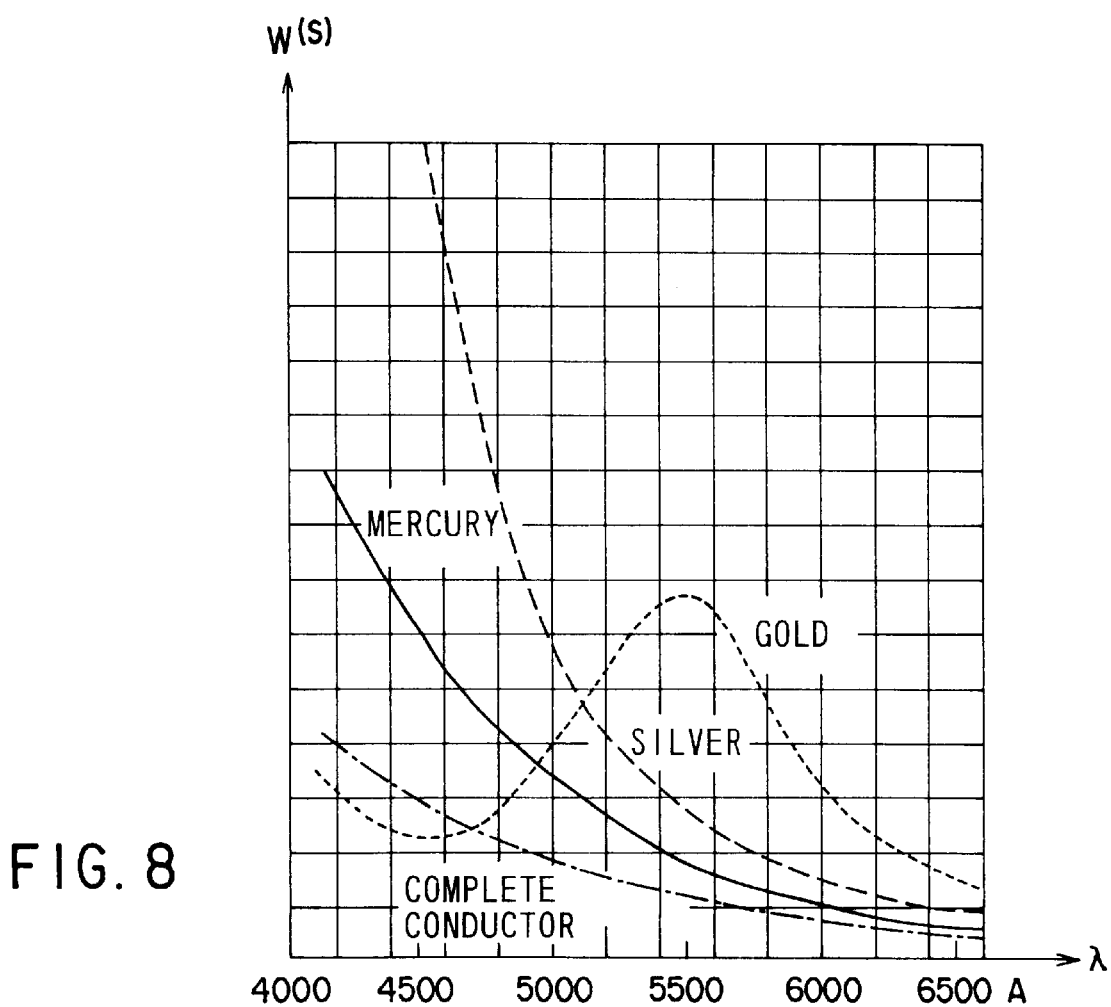
FIG. 8 is a graph showing the wavelength dependence of scattered light strength on a hypothetical variety of gold particles having an infinitely small diameter.
Figure 9:
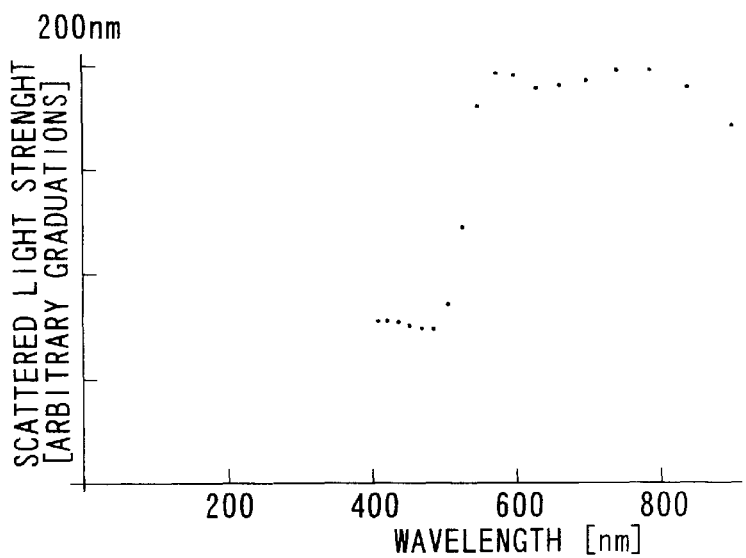
FIG. 9 is a graph showing the wavelength dependence of scattered light strength on a gold particle having a diameter of 200 nm.
Figure 10:
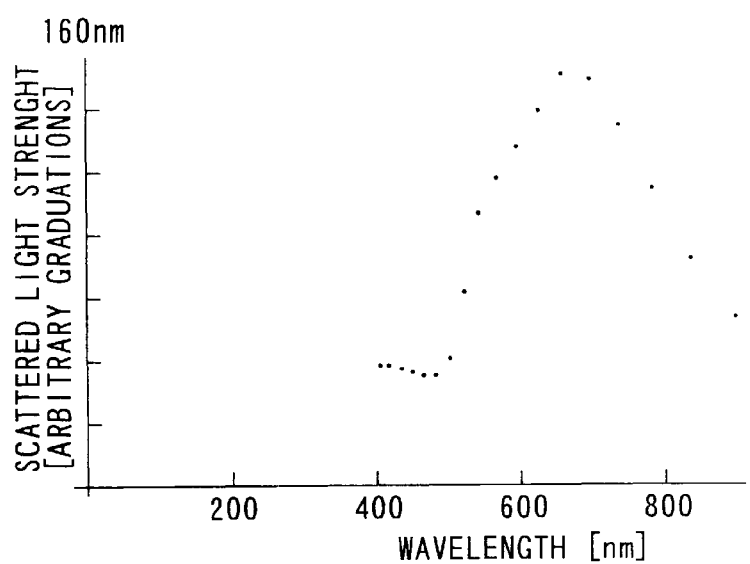
FIG. 10 is a graph showing the wavelength dependence of scattered light strength on a gold particle having a diameter of 160 nm.
Figure 11:
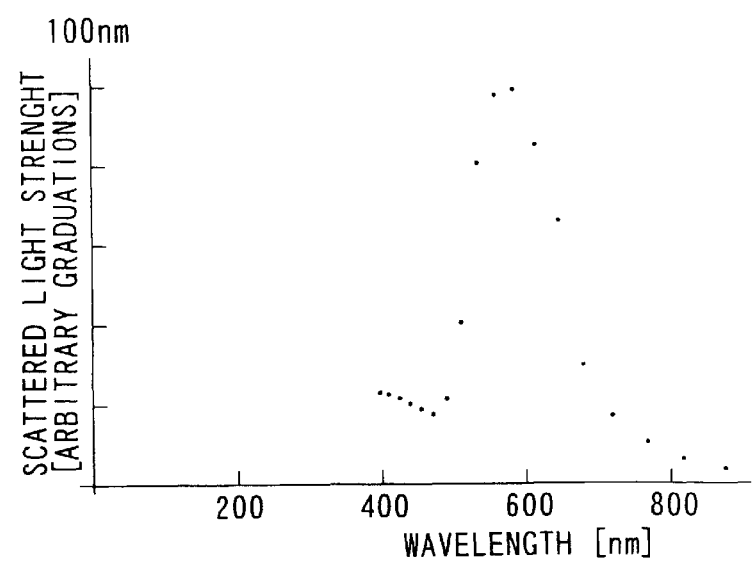
FIG. 11 is a graph showing the wavelength dependence of scattered light strength on a gold particle having a diameter of 100 nm.
Figure 12:
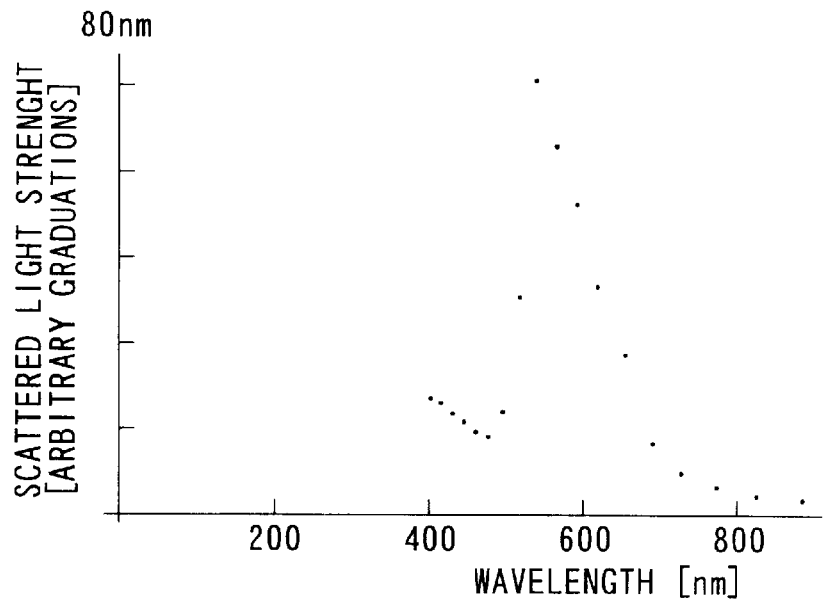
FIG. 12 is a graph showing the wavelength dependence of scattered light strength on a gold particle having a diameter of 80 nm.
Figure 13:
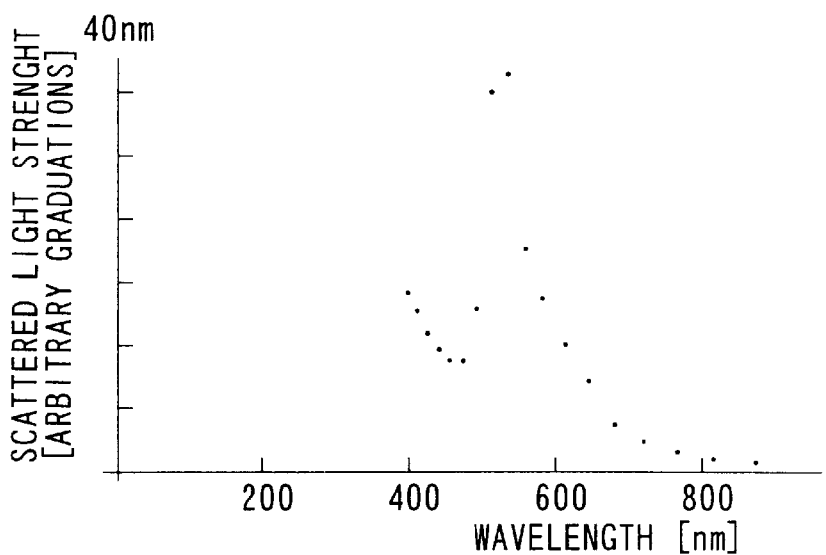
FIG. 13 is a graph showing the wavelength dependence of scattered light strength on a gold particle having a diameter of 40 nm.
Figure 14:
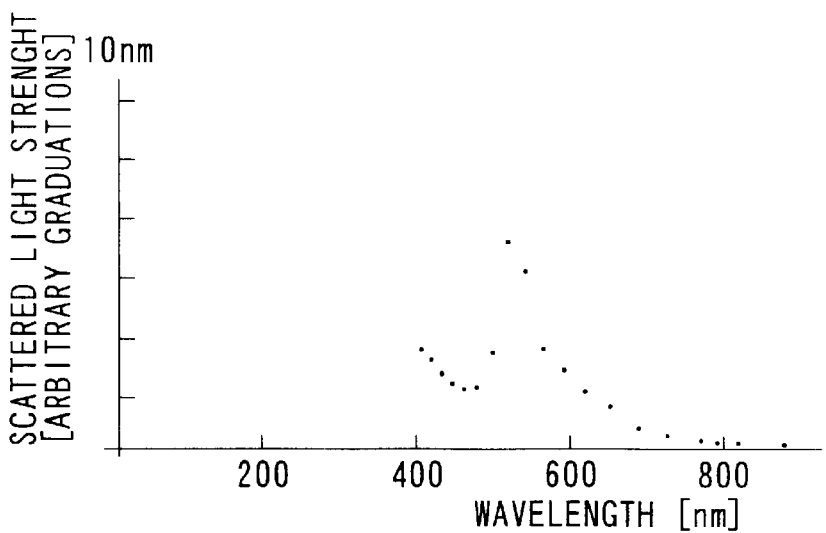
FIG. 14 is a graph showing the wavelength dependence of scattered light strength on a gold particle having a diameter of 10 nm.
Figure 15:
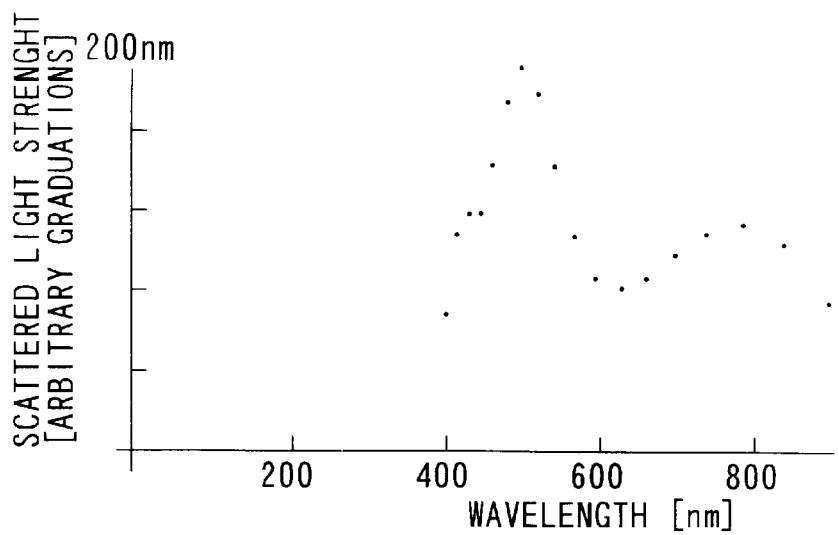
FIG. 15 is a graph showing the wavelength dependence of scattered light strength on a silver particle having a diameter of 200 nm.
Figure 16:
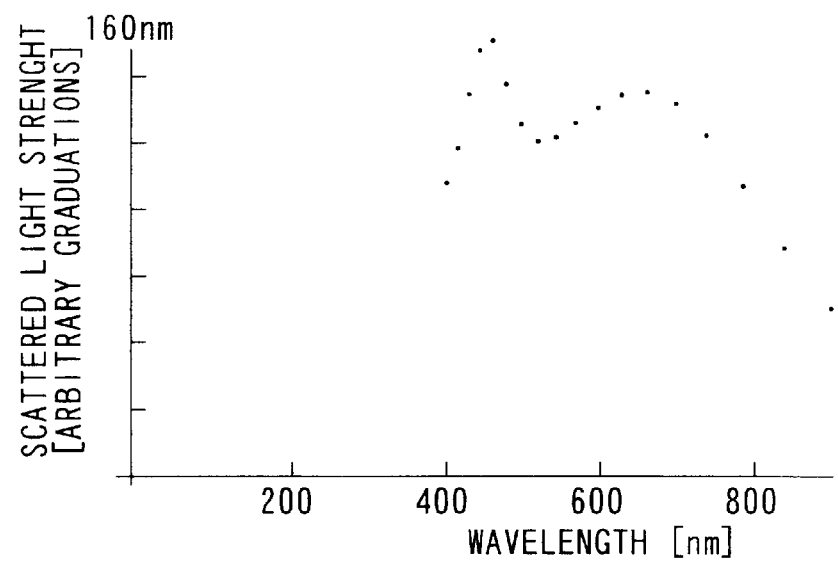
FIG. 16 is a graph showing the wavelength dependence of scattered light strength on a silver particle having a diameter of 160 nm.
Figure 17:
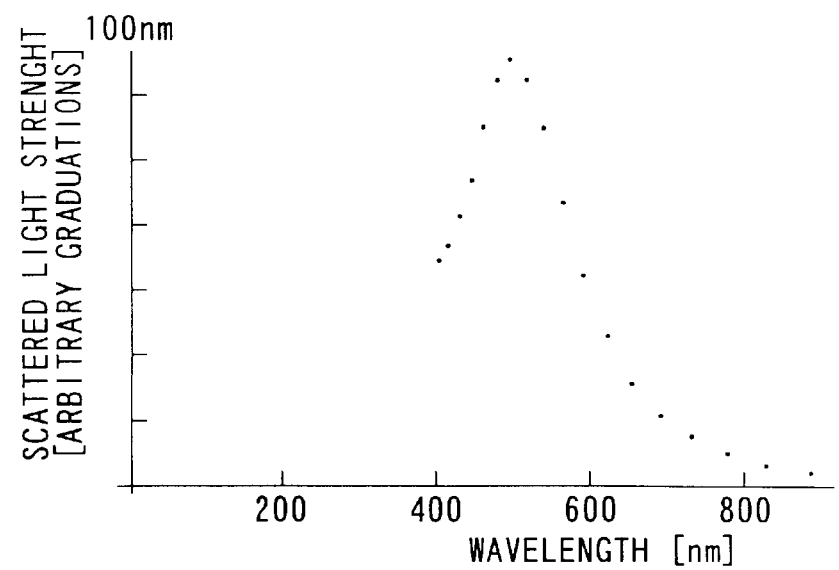
FIG. 17 is a graph showing the wavelength dependence of scattered light strength on a silver particle having a diameter of 100 nm.
Figure 18:
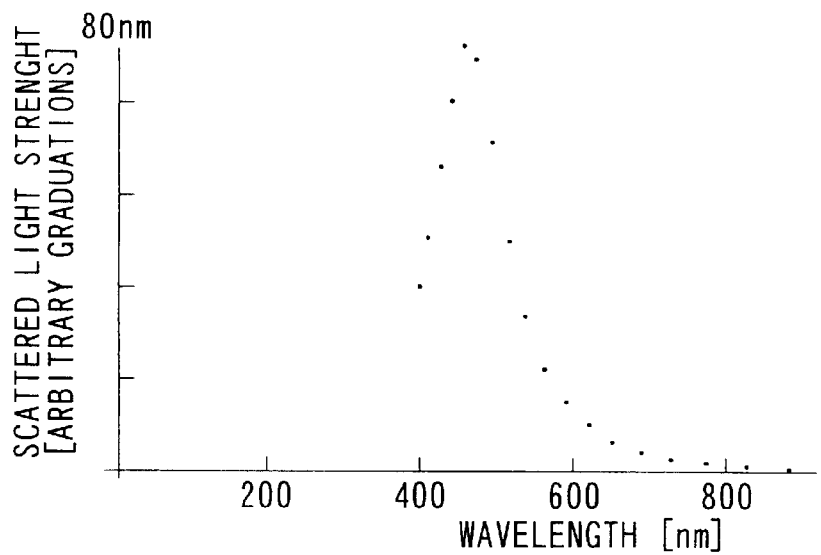
FIG. 18 is a graph showing the wavelength dependence of scattered light strength on a silver particle having a diameter of 80 nm.
Figure 19:
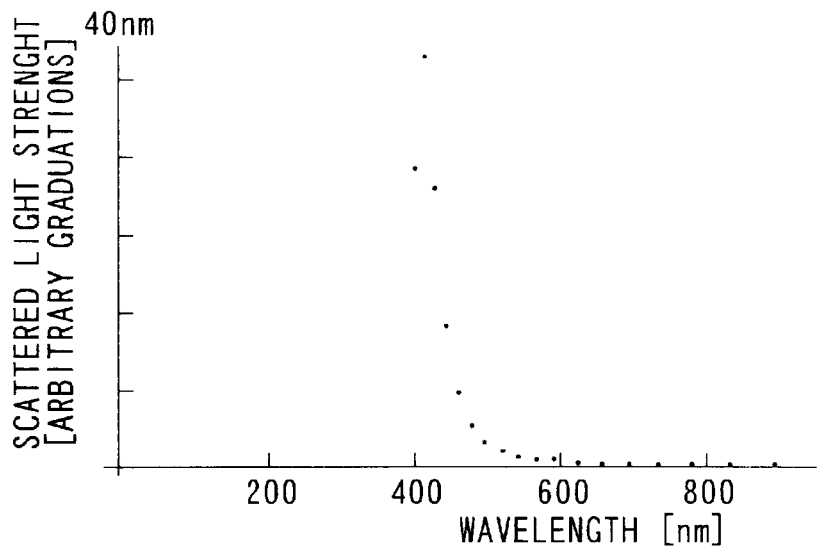
FIG. 19 is a graph showing the wavelength dependence of scattered light strength on a silver particle having a diameter of 40 nm.
Figure 20:
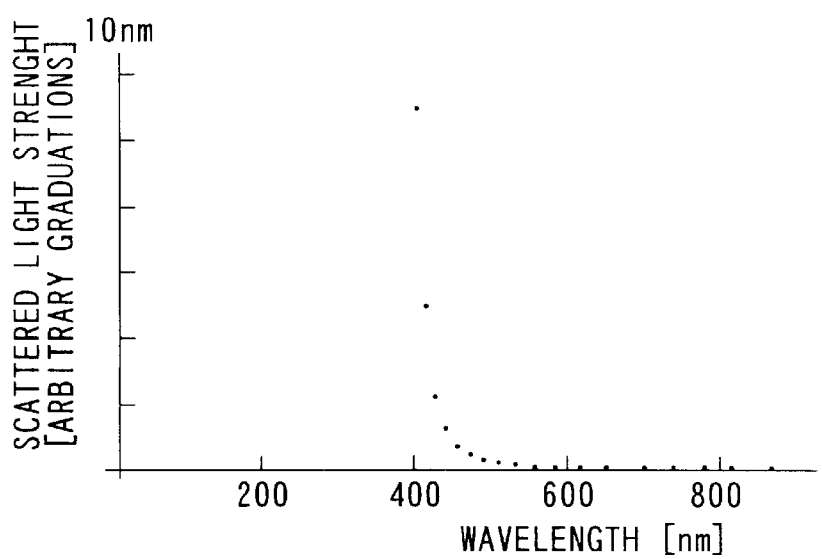
FIG. 20 is a graph showing the wavelength dependence of scattered light strength on a silver particle having a diameter of 10 nm.

FIG. 8 shows the wavelength dependence of the strength of the scattered light when light is illuminated at a constant strength, assuming that the diameter of the gold particle is infinitely small.

The scattered light strength peaks due to plasmon resonance.

As the graph shows, when the light is scattered by a gold particle having an infinitely smaller diameter, maximum scattering efficiency is attained when the wavelength of the illumination light is approximately 550 nm.

The light wavelength (i.e. the plasmon resonance wavelength) which achieves this peak changes in accordance with changes in the size of the gold particle.

FIGS. 9 to 14 show the wavelength dependence of the strength of light scattered by gold particles having diameters of 200 nm, 160 nm, 100 nm, 80 nm, 40 nm, and 10 nm respectively.

It is clear form these graphs that the peak position of plasmon resonance shifts toward the long wavelength side as the diameter of the gold particle increases.

Similar results are obtained in a test using a colloidal gold particle.

The plasmon resonance wavelength also changes when the refractive index of the scattering body changes.

FIGS. 15 to 20 show the wavelength dependence of the strength of light scattered by silver particles having diameters of 200 nm, 160 nm, 100 nm, 80 nm, 40 nm, and 10 nm respectively.

As is clear from a comparison of the graphs of FIGS. 15 to 20 with those of FIGS. 9 to 14, the plasmon resonance peak of the wavelength dependence of the strength of light scattered by the silver particle moves toward the short wavelength side, unlike that of the wavelength dependency of the strength of light scattered by the gold particle.

In the above explanation, a very small metallic particle was used, but plasmon resonance occurs when any Mie-type scattering body is used, even when the shape of the scattering body is a shape other than a very small particle.

For example, the scattering bodies 102, 106, and 108 perform scattering which closely resembles Mie scattering. Therefore, as can be understood from the above explanation, the wavelength of the plasmon resonance thereby generated is in accordance with the material comprising the probe and the diameter of its tip.

In this invention, plasmon resonance is generated when light is scattered by the scattering bodies 102, 106, and 108, consequently improving the scattering efficiency, and making it possible to detect an SNOM signal (i.e. a near field signal) at high S/N.

Several specific methods for generating plasmon resonance when scattering light using the scattering bodies 102, 106, and 108, will be explained.

(Method 1)

A first method uses a variable-wavelength light source as the laser light source 13 in the above-mentioned light-generating section, light wavelengths being selected such that the scattering bodies 102, 106, and 108 generates plasmon resonance.

For example, a tunable dye laser, a tunable titanium sapphire laser, a tunable semiconductor laser, and the like, may be used as such a tunable light source.

In this method, the scattering efficiency is maximized by using light having a wavelength at which plasmon resonance is generated.

The resultant improved signal strength enables a near field signal to be detected with excellent S/N.

(Method 2)

According to a second method, the sizes of the scattering bodies 102, 106, and 108, are selected in accordance with the wavelength of the laser light source 13 of the light-generating section, so that plasmon resonance is generated.

In this case, the laser light source 13 of the light-generating section need not be a tunable light source. Therefore, a single-line oscillating Ar laser or the like may be used as the laser light source 13.

Alternatively, a multiline oscillation Ar laser may used as the laser light source 13, and a frequency selecting line filter selects a single wavelength therefrom.

In this constitution, since there are several oscillation lines (e.g. a multiline oscillation Ar laser has main oscillation lines of 514.5 nm, 488 nm, and 459, as well as several weaker oscillation lines), the size of the scattering body which generates plasmon resonance increases by an amount equivalent to the wavelength.

In this method, the scattering efficiency is maximized by selecting a size of the scattering body which generates the plasmon resonance in accordance with the wavelength.

The resultant improved signal strength enables a near field signal to be detected with excellent S/N.

(Method 3)

According to a third method, the refractive indexes of the scattering bodies 102, 106, and 108, are selected in accordance with the wavelength of the laser light source 13 of the light-generating section, so that plasmon resonance is generated.

In this case, the laser light source 13 of the light-generating section need not be a tunable light source. Therefore, a single-line oscillating Ar laser or the like may be used as the laser light source 13.

Alternatively, a multiline oscillation Ar laser may used as the laser light source 13, and a frequency selecting line filter selects a single wavelength therefrom.

In this constitution, since there are several oscillation lines (e.g. a multiline oscillation Ar laser has main oscillation lines of 514.5 nm, 488 nm, and 459, as well as several weaker oscillation lines), the refractive index of the scattering body which generates plasmon resonance increases by an amount equivalent to the wavelength.

In this method, the scattering efficiency is maximized by selecting the refractive index of the scattering body which generates the plasmon resonance in accordance with the wavelength.

The resultant improved signal strength enables a near field signal to be detected with excellent S/N.

(Method 4)

According to a fourth method, a tunable dye laser, a tunable titanium sapphire laser, a tunable semiconductor laser, or the like, is used as such the laser light source 13 in the light-generating section, and a wavelength required to measure the sample is selected. In addition, the sizes and refractive indexes of the scattering bodies 102, 106, and 108, are selected in accordance with the selected wavelength, so that plasmon resonance is generated.

In this method, a wavelength required to measure the sample is selected, and the sizes and refractive indexes of the scattering bodies 102, 106, and 108 are selected so that plasmon resonance is generated at the selected wavelength, thereby maximizing the scattering efficiency.

The resultant improved signal strength enables a near field signal to be detected with excellent S/N. In addition, light having a wavelength appropriate for measuring the sample can be used.

(Method 5)

According to a fifth method, a tunable dye laser, a tunable titanium sapphire laser, a tunable semiconductor laser, or the like, is used as such the laser light source 13 in the light-generating section, and a wavelength required to measure the sample is selected. In addition, the diameters of the tips of the scattering bodies 102, 106, and 108 are selected in accordance with the resolution required for measuring, and the refractive indexes of the scattering bodies 102, 106, and 108, are selected in accordance with the selected wavelength and the selected diameters of the tip of the scattering bodies, so that plasmon resonance is generated.

In this method, a wavelength required to measure the sample is selected, the diameter of the tip of the scattering body is selected in accordance with the resolution required for measuring, and the refractive index of the scattering body is selected so that plasmon resonance is generated at the selected wavelength and the tip diameter of the scattering body, thereby maximizing the scattering efficiency.

As a result, light having a wavelength appropriate for measuring the sample can be used. In addition, a resolution required for measuring is achieved, and the improved signal strength enables a near field signal to be detected with excellent S/N.

This invention is not restricted to the embodiment described above, and includes all embodiments within the scope of its main concepts.

Therefore, according to the first embodiment of this invention, the scattering efficiency is increased by generating plasmon resonance when the probe scatters light, thereby providing a scanning near field optical microscope capable of detecting a near field signal with superior S/N, and a method for observing a sample using the scanning near field optical microscope.

(Second Embodiment)

A summary and principles of a signal detection section used in the scattering mode scanning near field optical microscope according to a second embodiment of this invention will be explained.

The signal detection means used in the scattering mode scanning near field optical microscope according to a second embodiment of this invention comprises illumination means which illuminates light onto the surface of a sample; a probe comprising a tip which is smaller than the wavelength of the illumination light and is provided near the sample, the illumination light being scattered the tip of the probe; light detection means which detects the scattered light; displacement detection means which detects displacement of the probe and a supporting member of the probe; scanning means which relatively scans the sample and the probe; control means which controls the distance between the probe and the sample, and the probe pressure, based on a signal from the displacement detection means; and an image processing means which captures a signal from the light detection means and forms an image therefrom. Light which has been scattered or generated by the tip of the probe changes according to the wavelength of the above illumination light.

A periodical modulation is added to the signal generated by periodically modulating (modulating frequency $\omega_2$) the frequency (wavelength) of the illumination light, and only the modulation frequency component of the scatter signal is extracted.

Furthermore, in the signal detection means used in the scattering mode scanning near field optical microscope according to the second embodiment of this invention, a periodical modulation is added to the signal generated by periodically modulating (modulating frequency $\omega_2$) the frequency (wavelength) of the illumination light, the probe is oscillated at a frequency ($\omega_1$) which differs very slightly from the modulating frequency of the wavelength of the illumination light, the scatter signal is simultaneously modulated by the wavelength modulation of the illumination light and the oscillation of the probe, and only the beat frequency components ($|\omega_2-\omega_1|$ and ($\omega_2+\omega_1$)) are extracted.

In the signal detection means used in the scattering-type scanning near field optical microscope according to this invention, periodical modulation is added by periodically modulating (modulating frequency $\omega_2$) the frequency (wavelength) of the illumination light.

In addition, reference light having a frequency ($\omega_0+\delta$) which differs slightly from the frequency ($\omega_0$) of the scattered light is made coherent with the generated signal, and only their beat frequency components ($|\omega_2-\delta|$ and ($\omega_2+\delta$)) are extracted.

The signal detection means of this constitution detects signals based on the following principle.

Assuming that the illumination light is modulated so that it fluctuates at a sine function at the frequency $\omega_2$, the scattered light $E_p$ from the probe above the sample can be expressed as $$E_p = E_{p0} + E_{p1} \sin \omega_2 t + E_{p2} \sin 2\omega_2 t + \ldots$$

The above expresses a case where the scattering efficiency modulates periodically in proportion to the frequency of the illumination laser light.

The light I detected when using a scattering source other than a probe is $$I=|E_s+E_{p0}+E_{p1}\sin\omega_2 t|^2$$

When $E_s \ll E_p$, $E_s$ can be ignored, whereby the lock-in amplifier extracts only $E_{p0} \times E_{p1}$, making it possible to eliminate unwanted scattered light from the scattering source.

Furthermore, when the probe is oscillated at an oscillation frequency of $\omega_1$ and hetrodine wave detection is carried out (extraction of the ($\omega_2 \pm \omega_1$ component), unwanted scattered light which cannot be eliminated merely by, for example, frequency modulation, can be eliminated effectively.

This is effective when the illumination light fluctuates between two values at the frequency $\omega_2$, or when luminescence is formed on the sample after the illumination light has been reflected therefrom.

For example, in the former case, since the illumination light repeatedly fluctuates between two wavelengths over a fixed period of time, the scattered light strength does not attain a clear peak in the manner described below.

In such a case, the unwanted scattered light can be more effectively eliminated by oscillating the probe.

Furthermore, when the signal from the scattering source is larger than the scatter signal from the probe ($E_s \gg E_p$), $E_s$ cannot be ignored.

Even strong unwanted scattered light from the scattering source can be eliminated by inserting a reference light having a frequency (wavelength) which differs from the frequency ($\omega_0$) of the scattered light only by $\delta$, making the reference light coherent with the scattered light from the probe in a detector, and executing a hetrodine wave detection (extracting the ($\omega_2 \pm \delta$ component).

Furthermore, by applying frequency modulation while oscillating the probe, and making the resultant scattered light coherent with the reference light, unwanted scattered light can be effectively eliminated from a scattering source having a scattering strength which changes according to changes in the wavelength, and from a scattering source which does not change according to the wavelength, even when the signal from the scattering source is larger than the scatter signal from the probe ($E_s \gg E_p$).

The scattering-type scanning near field optical microscope according to the second embodiment of this invention comprising the signal detecting means based on the summary and principles described above will be explained with reference to the drawings.

(Construction)

Based on the constitution shown in FIG. 21, the microscope according to the second embodiment substantially comprises a scattering mode scanning near field optical microscope which obtains a near field optical image by a sequence such as that described below.

Light from a laser light source 202 is illuminated to a sample 201 and a probe 100, and is scattered at the tip of the probe 100.

The scattered light passes through an objective lens 203, and is detected by a light detector comprising a photo multiplier tube 204.

The scattering-type scanning near field optical microscope of this type obtains a near field optical image by maintaining a constant distance between the sample 201 and the tip of the probe 100, while a piezoelectric tube scanner 205 scans the sample 201 and detects the scattered light.

(Probe)

Figure 22:
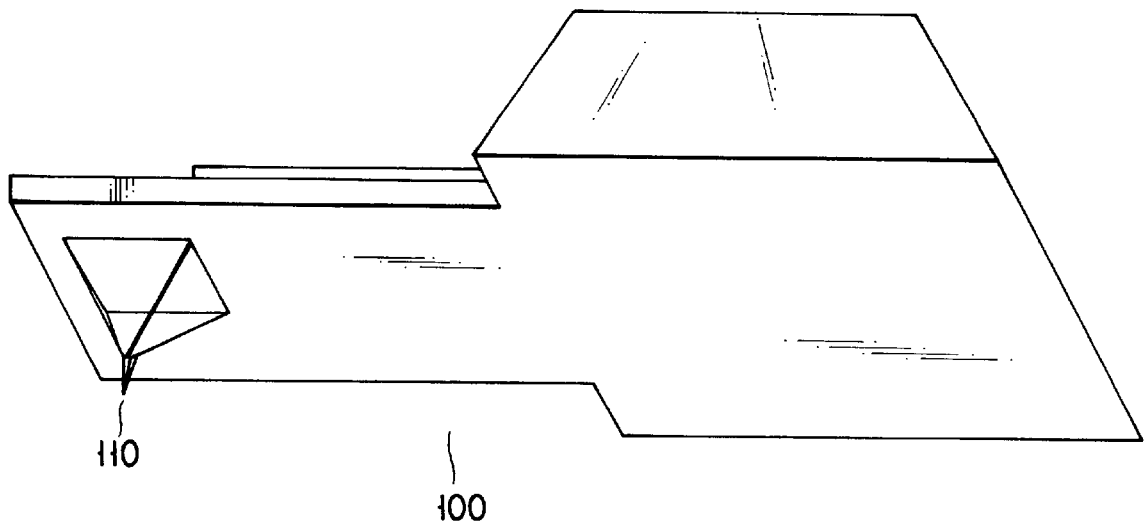
FIG. 22 is a diagram showing a cantilever of a probe 100 in the scattering-type scanning near field optical microscope according to the second embodiment of this invention.

The probe 100 in the scattering mode scanning near field optical microscope according to this embodiment has a cantilever structure such as that shown in FIG. 22.

The diameter of the tip of the probe 110 in this cantilever is smaller than the wavelength of the light from the laser light source 202. The tip of the probe 110 functions as a scattering body, or as a light-generating body.

The probe 110 comprises a light-generating material, a metal, or a dielectric having a high refractive index, or a coating of these materials.

In either case, the probe 110 scatters light by illumination, or generates luminescence by extinction.

The scattering efficiency or light-generating efficiency of the probe 110 need only change according to the wavelength of the illumination light.

When the diameter of the tip of the probe 110 is shorter than the wavelength of the illumination light, the length of the probe 110 from its tip to its base, and the size of its contact face may be greater than the wavelength of the illumination light.

(Oscillation)

Figure 21:
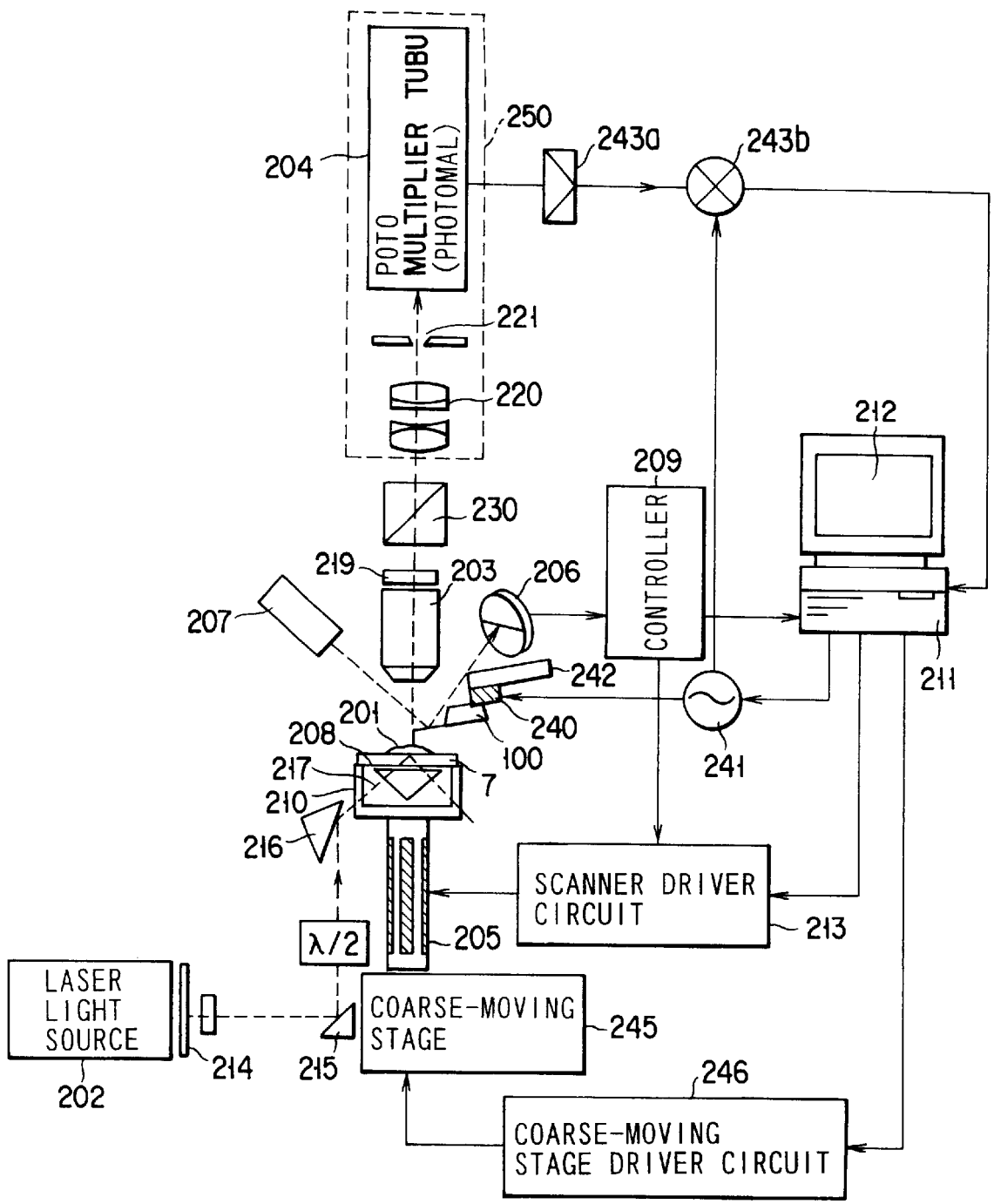
FIG. 21 is a diagram showing a constitution of a scattering-type scanning near field optical microscope according to a second embodiment of this invention.

As shown in FIG. 21, a probe oscillation section comprises an ultrasonic wave vibrator 240, and supports the probe 100 above the sample 201.

The probe 100 can apply oscillation at a frequency $\omega_1$ of high-frequency oscillator 241 by means of the ultrasonic wave vibrator 240 which comprises the light amplitude modulation means, and the high-frequency oscillator 241 which drives the ultrasonic wave vibrator 240.

(Position Sensor)

The scattering-type scanning near field optical microscope according to this embodiment further comprises a displacement sensor 206 which detects the displacement of the free end of the probe 100.

(Coase-Moving Stage and Sample)

In the scattering-type scanning near field optical microscope of this embodiment, the sample 201 is provided on a sample table 210. The sample table 210 functions together with a coarse-moving stage 245 to coarsely modulate the position of, and distance between, the sample 201 and the probe 110.

A coarse-moving stage driver circuit 246 drives the coarse-moving stage 245 in compliance with commands from a computer 211.

An internally reflecting prism 208 is provided independently over the sample table 210, and is optical coupled to a slide glass 207.

When evanescent waves are used as the illumination light, matching oil is required to couple the internally reflecting prism 208 to the slide glass 207.

(Precise Scanning)

In the scattering-type scanning near field optical microscope of this embodiment, precise scanning for measuring the sample 201 is performed as follows.

In FIG. 21, a scanner driver circuit 213, which is controlled by a controller 209 and the computer 211, drives the piezoelectric tube scanner 205 so as to precisely move the sample table 210 in three dimensions.

Therefore, since the sample 201 on the slide glass 207 provided on the sample table 210 is moved in three dimensions relative to the probe 110, the probe 110 scans precisely across the surface of the sample 201, and the distance between the tip of the sample 201 and the probe 110 is minutely adjusted.

In the present application, the scanning of the probe 110 across the surface of the sample 201 is expressed as XY scanning, and the adjustment of the distance between the tip of the probe 110 and the surface of the sample 201 is expressed as Z controlling.

(Light Generating Means)

The scattering mode scanning near field optical microscope of this embodiment further comprises light-generating means which illuminates coherent light, generating a light filed between the probe 110 and the sample 201.

This light-generating section comprises a local light generating section which generates nonpropagated local light, and a propagated light generating section which generates propagated light. Either of the two types of light is selected in accordance with various characteristics of the sample, such as its thickness and constituent material.

Local light signifies light which is not propagated in space, such as, for example, evanescent light.

Propagated light signifies light which is propagated in space, such as, for example, normal propagated light.

The local light generating means and the propagated light generating means will be explained in detail.

In FIG. 21, the local light generating means, more particularly the evanescent light generating means, comprises the laser light source 202, optical components 214 which control the polarization and wavelength, two mirrors 215 and 216, and an internally fully-reflecting prism 217.

Laser light from the laser source 202 passes through the various types of optical components 214, the mirrors 215 and 216, and is illuminated into the internally fully-reflecting prism 217.

The mirror 216 controls the illumination angle of the laser light at this time so that it is fully reflected by the top face of the internally fully-reflecting prism 217.

As a result, evanescent light is generated near the surface of the sample 201.

When necessary, a lens which focuses the laser light may be provided behind the mirror 216.

The propagated light generating section comprises the laser light source 202, the optical components 214, and the two mirrors 215 and 216 of FIG. 21, in addition to another mirror which is not shown in the diagram. The propagated light generating section obtains a parallel laser beam by the same method as the evanescent light generating section. This parallel laser beam is reflected by the mirrors 215 and 216, and its position and angle are altered by the mirror which is not shown, so that the beam is illuminated from diagonally above the sample 201 near to the sample 201 and the probe 110.

(Reference Light Illuminating Means)

The scattering-type scanning near field optical microscope according to this embodiment comprises a beam splitter 230 which illuminates a reference light having a slightly different wavelength ($\delta$) to that of the light ($\omega_0$) illuminated on the objective lens 20.

The beam splitter 230 can adjust the light path of the reference light so that it is coherent with a signal detected by the objective lens 203.

A polarization beam splitter may be used as the beam splitter 230, in order to efficiently illuminate the reference light and the signal light to the photomal 204.

However, when this type of polarization beam splitter is used, the polarization of the reference light and the signal light must be controlled.

The reference light need only be illuminated when necessary.

(Detection System)

As shown in FIG. 21, in the scattering-type scanning near field optical microscope according to this embodiment, an objective lens 203 is provided on the probe 100, and focuses the scattered light generated near the tip of the probe 110. When necessary, the light passes through a polarizer 219, and is detected by a light detector comprising the photo multiplier tube 204, which is provided in a scattered light detection observation tube 250.

The scattered light detection observation tube 250 comprises a tube lens 220, a pinhole 221, and a light detector comprising the photo multiplier tube 204.

The pinhole 221 is provided at a position with respect to the objective lens 203 and the lens group 220 such that it performs the same optical function as the probe.

That is, one face of the pinhole 221 is an image-forming form.

Therefore, the pinhole 221 cuts off most of the components other than the scattered light generated near the tip of the probe 110.

The light detector comprising the photo multiplier tube 204 outputs an electrical signal in accordance with the strength of the received light.

Similar effects are achieved when one face of an optical fiber is provided at the pinhole position instead of the pinhole 221.

In this case, the near field signal permeates the optical fiber and is detected by the light detector comprising the photo multiplier tube 204. Therefore, the photo multiplier tube 204 can be provided at a predetermined position other than on the scattered light detection observation tube 250.

Generally, in a scattering-type scanning near field optical microscope such as that according to this embodiment, the distance between the tip of the probe 110 and the sample 201 (in the dynamic mode, an average distance) is kept constant in order to measure near field light.

In this state, light illuminating means forms light near the tip of the probe and the sample, and the photo multiplier tube 204 detects the strength (or average strength) of light scattered therefrom. A CPU, which is provided on a substrate in computer 211 such as a PC, creates an image signal and processes the image signal, whereby an SNOM image is obtained on a monitor 212.

(Frequency (Wavelength) Modulating Means)

Generally, in a scattering-type scanning near field optical microscope such as that of this embodiment, the frequency (wavelength) of the illumination light is modulated at a constant frequency.

The amplitude of the frequency modulation, that is, the modulation frequency (in other words, the difference in wavelength), and the modulation cycle, are selected in accordance with the sample to be measured.

Figure 23:
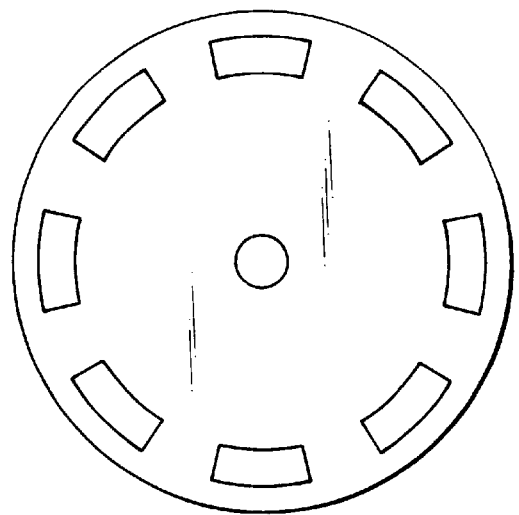
FIG. 23 is a diagram showing a constitution of a chopper functioning as frequency (wavelength) modulation means in the scattering mode scanning near field optical microscope according to the second embodiment of this invention, using a multiline oscillation algon ion laser, and combining two types of wavelength selection filters.
Figure 24A:
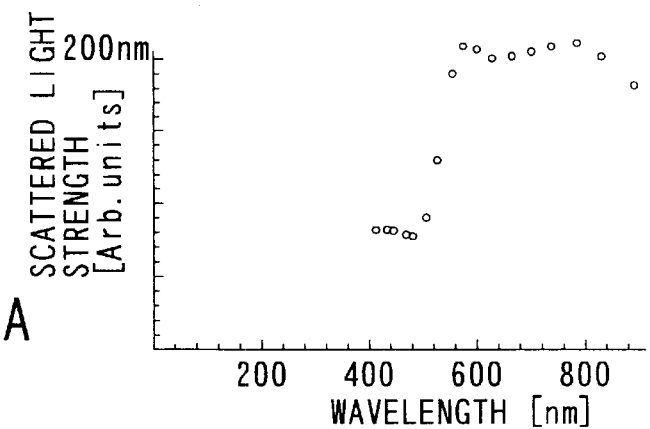
FIGS. 24A to 24D are diagrams showing that a plasmon resonance peak changes in correspondence with the diameter of a laser-trapped metallic particle used as the scattering probe in the scattering mode scanning near field optical microscope according to a third embodiment of this invention.
Figure 24B:
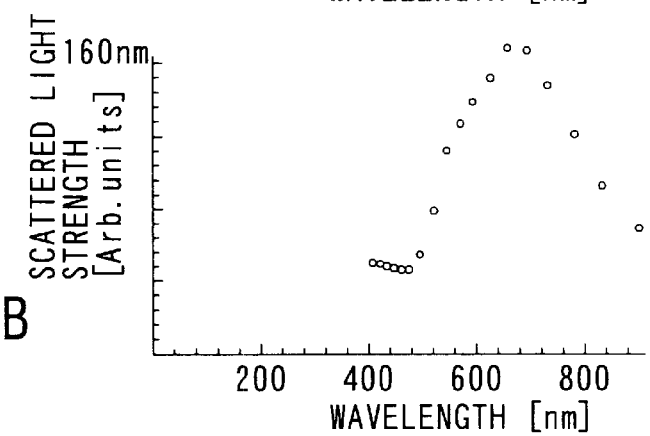
Figure 24C:
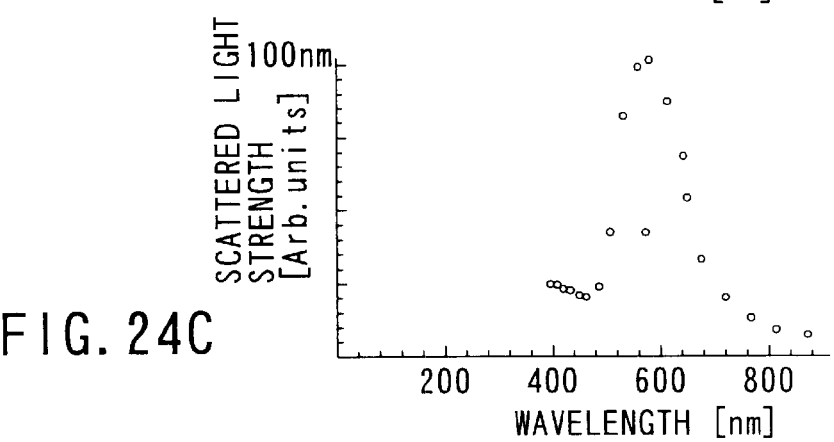
Figure 24D:
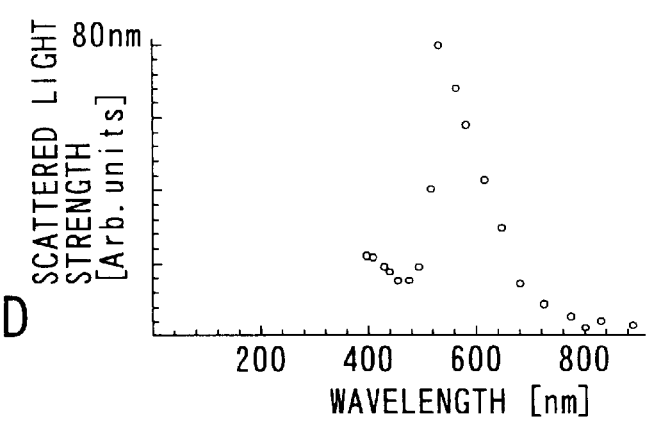

Here, a multiline oscillation algon laser is used as the frequency (wavelength) modulation means, and by using a chopper comprising a combination of two types of wave-selecting filter as shown in FIG. 23, it is possible to repeatedly radiate two waves (488 nm and 514 nm) in a predetermined cycle.

The repetition frequency of the wavelength is determined according to the rotation speed of the chopper comprising the illumination light modulation means as shown in FIG. 23. When using mechanical rotation, the upper limit is several hundred kHz.

A laser line filter, a bandpass filter, a longpass filter, and a coherence filter, can be used as the wave-selecting filters.

Furthermore, after the laser light has permeated the filter, its strength must be controlled by adding an ND wave-selecting filter which keeps the strength of the laser light equal.

The above frequency (wavelength) modulation section can be applied not only to an algon laser, but also to a multiline oscillation laser (e.g. a helicad laser or a YAG laser), and a broadband oscillation laser (e.g. a dye laser).

Alternatively, using a tunable laser (a dye laser or a titanium sapphire laser), the frequency (wavelength) can be modulated by the rotation of a birefringent filter, or the rotation of a Breuster plate.

In the former case, the frequency can be modulated at an amplitude within the frequency band of the gain of the laser medium (when converted to a wavelength, approximately 100 nm). In the latter case, the frequency can be modulated by approximately 1 nm.

According to this method, the modulation frequency $\omega_2$ is approximately 10 Hz.

When a single mode oscillation laser (an algon laser, a dye laser, a titanium sapphire laser, a stabilized helium neon laser, and such like) is used, it is possible to modulate the frequency using an acoustic optical modulator.

In this case, the frequency amplitude (band) of an acoustic optical element is less than approximately 1 nm, but the modulation frequency $\omega_2$ can be raised to the order of a MHz.

The frequency (wavelength) modulation means must be selected in accordance with the amplitude and cycle of the wave used.

(Measurement)

To perform measuring, light is illuminated to the probe 110. The light is scattered by the tip of the probe 110, and detected by the photo multiplier tube 204. The computer 211 extracts a signal from the photo multiplier tube 204, creates an image signal, and carries out predetermined image signal processing.

The result of this image signal processing is displayed on the monitor 212 of the computer 211.

In this case, the frequency (wavelength) of the illumination light is modulated at a constant frequency.

For example, the wavelength of the laser light fluctuates between 600 nm and 570 nm at a constant frequency.

When it is assumed that the tip of the probe 110 has a plasmon resonance wavelength near 570 nm, the strength of the scattered light ought to have wavelength dependency as shown in FIGS. 24A to 24D. When the wavelength of the illumination light deviates from the plasmon resonance frequency, the strength of the scattered light attenuates sharply.

An image of the amplitude of the strength of the scattered light is created by a lock-in amplifier 243a, in which a scattered light strength signal is synchronized with the frequency modulation of the illumination light, so that the scattered light is detected only when the wavelength is such that the scattered light can attain its maximum strength.

(Probe Oscillation)

An ultrasonic wave vibrator 40 connects to the probe 100, and oscillates the probe 100 so that the probe 110 oscillates at a constant amplitude in a direction approximately at a right angle to the surface of the sample 201.

Normally, when the probe 110 is oscillated upwards and downwards, the strength of the scattered light fluctuates at the oscillation frequency $\omega_1$ of the probe 110.

In this case, the strength of the scattered light fluctuates at $\omega_2$ due to the wavelength fluctuation of the illumination light. Therefore, unwanted scattered light can be eliminated when the computer 211 lock-in detects, via a mixer 243b, the differential frequency component $|\omega_2-\omega_1|$ or the sum frequency component $(\omega_2+\omega_1)$ from the detected scatter signals.

(Heterodyne Detection)

In the present embodiment, the reference light which is illuminated through the beam splitter 230 is adjusted so as to become coherent to the scattered light on the light-receiving face of the photo multiplier tube 204 which comprises the light-detecting section.

When the scattered light is modulated by the frequency modulation of the illumination light, by using the computer 211 to extract, via the mixer 243b, the differential frequency component $|\omega_2-\delta|$ or the sum frequency component $(\omega_2+\delta)$ from the coherent light detected by the photo multiplier tube 204, a scatter signal can be extracted from the probe even when there is strong unwanted scattered light from sources other than the probe.

Similarly, when the probe 100 is oscillating in addition to the frequency modulation, unwanted scattered light can be effectively eliminated by lock-in detecting a frequency component which takes into consideration the sum and differential frequencies with respect to $\omega_1$.

(Third Embodiment)

(Laser Trap of the Probe)

The constitution of the device according to a third embodiment of this invention is the same as the constitution of the device shown in FIG. 21, with the exception of a laser trap constitution described below. A laser-trapped metallic particle are used as the probe 110.

For example, gold and silver are often used as the metallic particle.

These metallic particles are known to generate plasmon resonance which strengthens scattered light, the plasmon resonance wavelength being strongly dependent on the material and diameter of the particle.

For example, as shown in FIGS. 24A to 24D, the peak of the plasmon resonance changes in correspondence with the diameter of the particle.

When the scattering probe comprises gold having a diameter of 80 nm, the peak wavelength of the plasmon resonance is close to 570 nm.

When a laser-trapped metallic particle is used as the probe 100, a laser source for trapping must be provided in addition to the illuminated laser light source 202.

(Laser Trap)

The greater the wavelength of the laser light for trapping differs from the wavelength of the laser light from the laser source 202, the easier it is to eliminate noise from the laser light source for trapping.

Figure 25A:
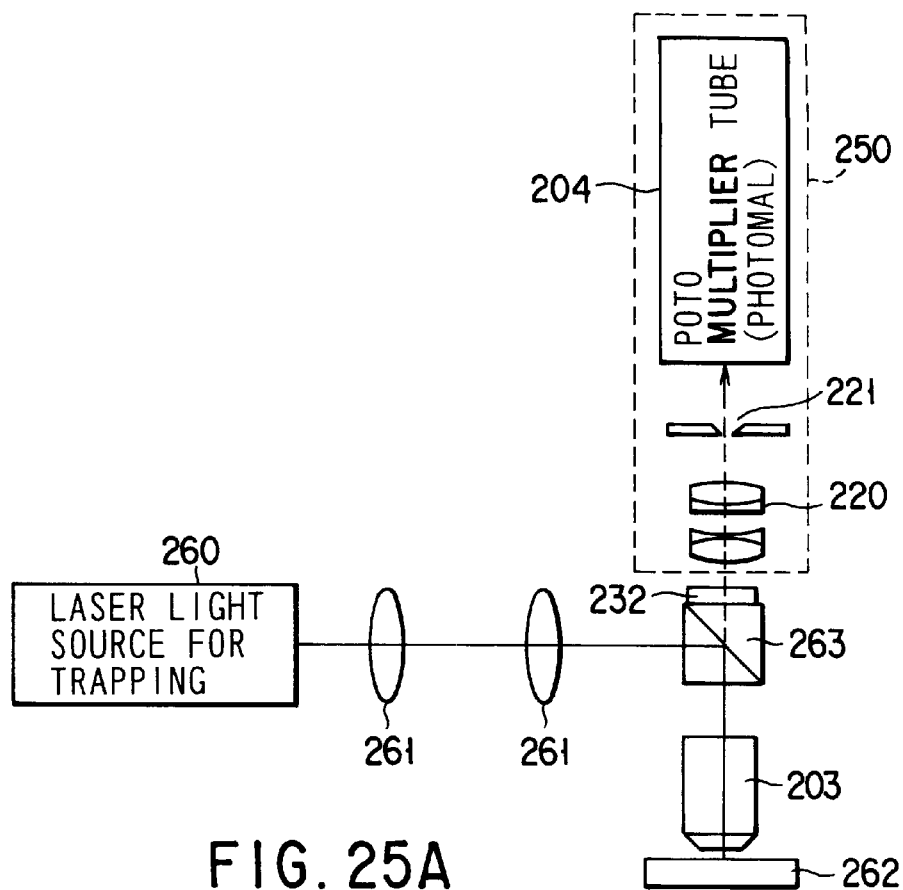
FIGS. 25A and 25B are diagrams showing constitution of a laser trap used as the scattering probe in the scattering mode scanning near field optical microscope according to the third embodiment of this invention.
Figure 25B:
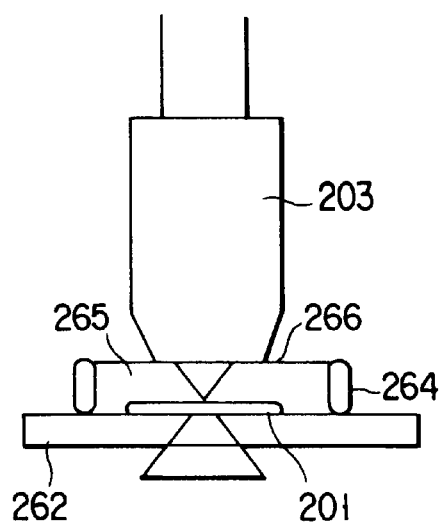

FIGS. 25A and 25B are diagrams showing a method for laser trapping.

Laser light from a laser light source for trapping 260 shown in FIG. 25A must have a wavelength which is different to the wavelength of the laser light from the laser light source for near field measurement 202 shown in FIG. 21.

The laser light from the laser light source for trapping 260 is adjusted to a parallel beam by a colimeter lens 261, and guided via a beam splitter 263 from above the objective lens for focusing scattered light 203 so as to converge on the sample surface.

As shown in FIG. 25B, the sample 201, and a surround 264 which surrounds the sample 201, are provided on a sample holder 262. The surround 264 is filled with a gold colloid aqueous solution or a silver colloid aqueous solution 265.

The gold colloid aqueous solution or silver colloid aqueous solution 265 in the surround 264 is tightly sealed by a lid comprising a glass cover 266.

When using laser trapping, the objective lens 203 should preferably have a large N/A. For this reason, an oil-immersion or a water-immersion objective lens may be used.

When the probe 100 comprises a laser-trapped metallic particle, the metallic particle is trapped at the point where the laser light for trapping converges.

When the trap position in on the sample surface, laser light for near field measurement is illuminated, and scattered light is detected via the objective lens 203 according to the method described above.

The laser light for trapping is mixed with the scattered light detected by the above method. Therefore, a filter 232 or the like is used to separate the signal light components from the unwanted light components.

Measurement and hetrodine detection can be performed in the same way as described already in the second embodiment.

(Fourth Embodiment)
(Probe)

The constitution of the device according to a fourth embodiment of this invention is the same as that of the device shown in FIG. 21, with an additional feature that the scattered light at the tip of the probe 110 generates plasmon resonance.

Figure 26A:
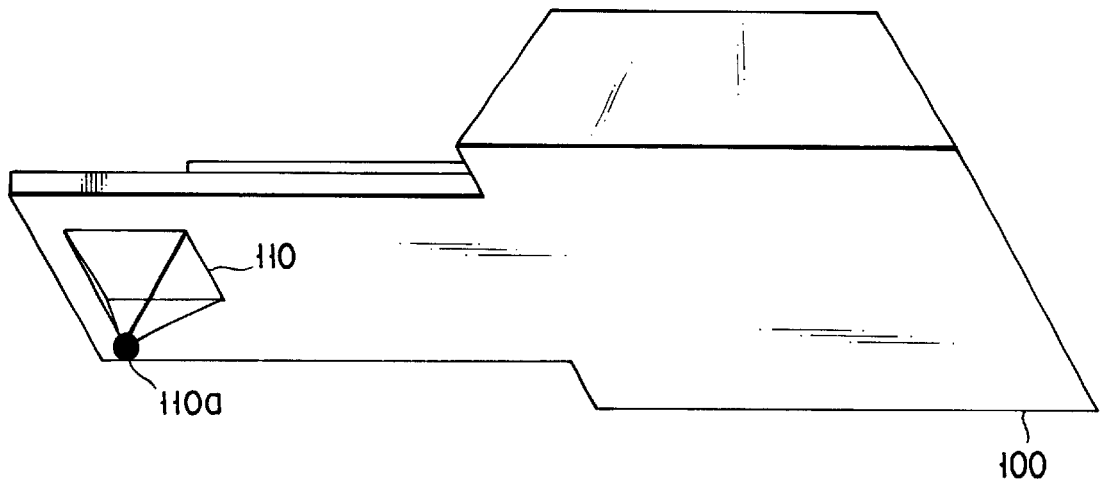
FIGS. 26A and 26B are diagrams showing a probe structure at the tip of a probe used in the scattering-type scanning near field optical microscope according to a fourth embodiment of this invention.
Figure 26B:
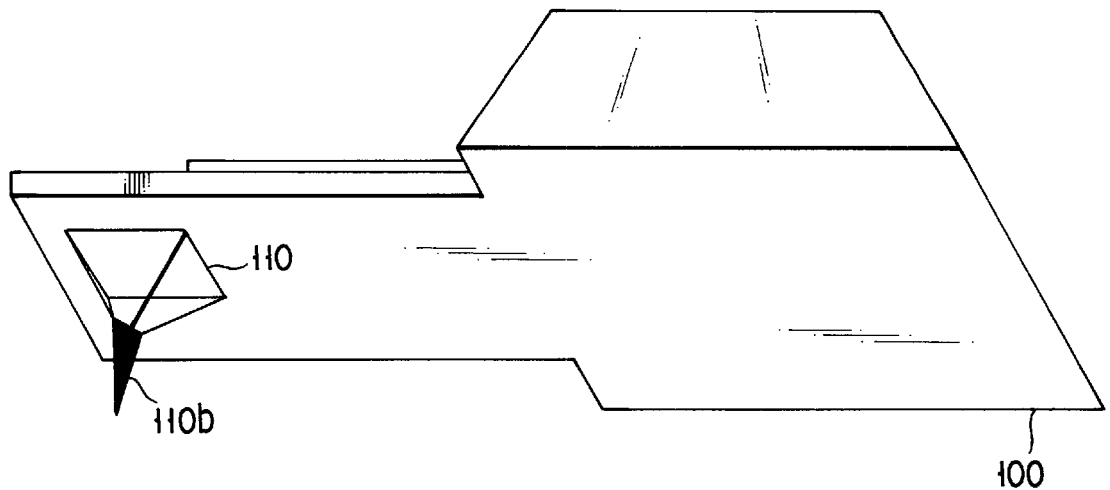

To achieve this, the probe 110 section on the tip of the probe 100 is coated with gold or silver as shown in FIG. 22. Alternatively, a projecting section 110b or a metallic particle 110a comprising gold, silver, and the like, is provided at the tip of the probe 100 as shown in FIGS. 26A and 26B.

The other methods in this embodiment of the invention can be realized in the same way as in the second embodiment described above.

(Fifth Embodiment)
(Probe)

The constitution of the device according to a fifth embodiment of this invention is the same as that of the device shown in FIG. 21, with the exception that that the probe 110 generates luminescence at its tip, and this luminescence functions as a near field light source.

To achieve this, the probe 110 section on the tip of the probe 100 shown in FIG. 22 is coated with a material which generates luminescence, such as, for example, a semiconductor such as GaAs, a dye-doped polymer, and crystal, glass, or polymer in which rare earth ions or the like have been dispersed. Alternatively, a projecting section comprising the above is provided at the tip.

(Detection System)

The luminescence generated near the tip of the probe 110 is focused by the objective lens 203 provided above the probe 100, and passes through a filter (not shown in FIG. 21) which selectively passes only light at the luminescence wavelength. Thereafter, an optical detector 204 in the scattered light detection mirror-tube 250 detects the light.

The optical system as far as the optical detector 204 is the same as FIG. 21.

Before entering the optical detector 204, the light may be guided into a fiber at the position of the optical detector 204, and split by a splitter not shown in the diagram. Thereafter, the optical detector detects only the luminescence wavelength.

(Reference Light)

The wavelength of the reference light in the present embodiment of this invention is set to +δ or −δ of the luminescence wavelength $\omega_0$, and the optical detector 204 makes this reference light coherent with the luminescent scattered light.

The other methods in this embodiment of the invention can be realized in the same way as in the second embodiment described above.

(Sixth Embodiment)

The constitution of the device according to a fifth embodiment of this invention is the same as that of the device shown in FIG. 21, but this embodiment relates to a method for measuring when the characteristics of the sample surface change in accordance with changes in the wavelength of the illuminated laser light.

EXAMPLE 1

This aspect is applied when measuring a sample which for example generates luminescence or Raman light, or a sample wherein plasmon resonance is liable to occur on the surface thereof.

The other methods in this aspect can be realized in the same way as in the second embodiment described above.

EXAMPLE 2

This aspect is applied when handling a sample wherein the strength or wavelength of luminescence or Raman light generated on the surface of the sample changes in accordance with changes in the wavelength of the illumination laser light.

The other methods in this aspect can be realized in the same way as in the second embodiment described above.

EXAMPLE 3

This aspect is applied when handling a sample wherein plasmon resonance is liable to occur on the surface of the sample in accordance with changes in the wavelength of the illuminated laser light.

The other methods in this aspect can be realized in the same way as in the second embodiment described above.

Therefore, as described above, according to the Second to Sixth Embodiments of this invention, it is possible to provide a near field optical microscope comprising signal detecting means which obtains an image having good S/N by modulating a signal from a sample by modulating the wavelength of the light illuminated thereto, and extracting an SNOM signal from the modulated signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A near field optical microscope comprising:
   a light illumination portion which illuminates light to the surface of a sample;
   a probe having a tip provided near to the sample, the tip of the probe generating scattered light originating in light illuminated by the light illumination portion;
   a light detection portion which detects light scattered by the probe;
   an illumination light modulation portion which modulates the wavelength of the light illuminated by the light illumination portion at a first frequency;
   a probe oscillation portion which oscillates the probe at a second frequency; and
   an extraction portion which extracts a beat frequency component of the first frequency of the illumination light modulation portion and the second frequency of the probe oscillation portion from an output of the light detection portion.

2. A near field optical microscope comprising:
   a light illumination portion which illuminates light to the surface of a sample;

a probe having a tip provided near to the sample, the tip of the probe generating scattered light originating in light illuminated by the light illumination portion;

a light detection portion which detects light scattered by the probe;

an illumination light modulation portion which modulates the wavelength of the light illuminated by the light illumination portion at a first frequency;

a coherence portion which makes a reference light, at a frequency differing only by a frequency $\delta$ from the scattered light generated by the probe, coherent with the scattered light; and an extraction portion which extracts a beat frequency component of the first frequency of the illumination light modulation portion and the frequency $\delta$ of the coherence portion from an output of the light detection portion.

3. A near field optical microscope comprising:

a light illumination portion which illuminates light to the surface of a sample;

a probe having a tip provided near to the sample, the tip of the probe generating scattered light originating in light illuminated by the light illumination portion;

a light detection portion which detects light scattered by the probe;

an illumination light modulation portion which modulates the wavelength of the light illuminated by the light illumination portion at a first frequency;

a probe oscillation portion which oscillates the probe at a second frequency;

a coherence portion which makes a reference light, at a frequency differing only by a frequency $\delta$ from the scattered light generated by the probe, coherent with the scattered light; and an extraction portion which extracts a beat frequency component of the first frequency of the illumination light modulation portion and the frequency $\delta$ of the coherence portion from an output of the light detection portion.

4. A near field optical microscope comprising:

a light illumination portion which illuminates light to the surface of a sample;

a probe having a tip smaller than the wavelength of light illuminated by the light illumination portion, the tip being provided near to the sample, and the tip thereof scattering the light;

a light detection portion which detects light scattered by the probe;

a displacement detection portion which detects the displacement of at least one of the probe and a supporting member which supports the probe;

a scanning portion which relatively scans the sample and the probe;

a controller which controls at least one of the distance between the probe and the sample, and the compressive force of the probe, based on a displacement detection signal from the displacement detection portion;

a signal capture portion which captures the displacement detection signal from the displacement detection portion;

an image formation portion which forms an image of a displacement detection signal captured by the signal capture portion; and a signal detection portion which, when at least one of the scattered light from the tip of the probe and the generated light changes in accordance with the wavelength of the illumination light, periodically applies modulation to a signal generated by periodically modulating (modulation frequency $\omega_2$) the frequency (wavelength) of the light illuminated by the light illumination portion, and extracts only the modulation frequency component of a scattered signal.

5. A near field optical microscope comprising:

a light illumination portion which illuminates light to the surface of a sample;

a probe having a tip smaller than the wavelength of light illuminated by the light illumination portion, the tip being provided near to the sample, and the tip thereof scattering the light;

a light detection portion which detects light scattered by the probe;

a displacement detection portion which detects the displacement of at least one of the probe and a supporting member which supports the probe;

a scanning portion which relatively scans the sample and the probe;

a controller which controls at least one of the distance between the probe and the sample, and the compressive force of the probe, based on a displacement detection signal from the displacement detection portion;

a signal capture portion which captures the displacement detection signal from the displacement detection portion;

an image formation portion which forms an image of a displacement detection signal captured by the signal capture portion; and a signal detection portion which, when at least one of the scattered light from the tip of the probe and the generated light changes in accordance with the wavelength of the illumination light, periodically applies modulation to a signal generated by periodically modulating (modulation frequency $\omega_2$) the frequency (wavelength) of the light illuminated by the light illumination portion, oscillates the probe at a frequency ($\omega_1$) differing slightly from the modulation frequency of the wavelength of the illumination light, simultaneously applies the wavelength modulation of the illumination light and the modulation generated by oscillating the probe to a scatter signal, and extracts only the beat frequency components ($|\omega_2-\omega_1|$ and ($\omega_2+\omega_1$)) of both.

6. A near field optical microscope comprising:

a light illumination portion which illuminates light to the surface of a sample;

a probe having a tip smaller than the wavelength of light illuminated by the light illumination portion, the tip being provided near to the sample, and the tip thereof scattering the light;

a light detection portion which detects light scattered by the probe;

a displacement detection portion which detects the displacement of at least one of the probe and a supporting member which supports the probe;

a scanning portion which relatively scans the sample and the probe;

a controller which controls at least one of the distance between the probe and the sample, and the compressive force of the probe, based on a displacement detection signal from the displacement detection portion;

a signal capture portion which captures the displacement detection signal from the displacement detection portion;

an image formation portion which forms an image of a displacement detection signal captured by the signal capture portion; and a signal detection portion which, when at least one of the scattered light from the tip of the probe and the generated light changes in accordance with the wavelength of the illumination light, periodically applies modulation to a signal generated by periodically modulating (modulation frequency $\omega_2$) the frequency (wavelength) of the light illuminated by the light illumination portion, makes the generated signal coherent with a reference light having a frequency ($\omega_0+\delta$) which differs slightly from the modulation frequency of the scattered light ($\omega_0$), and extracts only the beat frequency components ($|\omega_2-\delta|$ and ($\omega_2+\delta$)) of both.

7. A near field optical microscope comprising:

a light illumination portion which illuminates light to the surface of a sample;

a probe having a tip smaller than the wavelength of light illuminated by the light illumination portion, the tip being provided near to the sample, and the tip thereof scattering the light;

a light detection portion which detects light scattered by the probe;

a displacement detection portion which detects the displacement of at least one of the probe and a supporting member which supports the probe;

a scanning portion which relatively scans the sample and the probe;

a controller which controls at least one of the distance between the probe and the sample, and the compressive force of the probe, based on a displacement detection signal from the displacement detection portion;

a signal capture portion which captures the displacement detection signal from the displacement detection portion;

an image formation portion which forms an image of a displacement detection signal captured by the signal capture portion; and a signal detection portion which, when at least one of the scattered light from the tip of the probe and the generated light changes in accordance with the wavelength of the illumination light, periodically applies modulation to a signal generated by periodically modulating (modulation frequency $\omega_2$) the frequency (wavelength) of the light illuminated by the light illumination portion, simultaneously applies the wavelength modulation of the illumination light and the modulation generated by oscillating the probe to a scattered signal, makes the generated signal coherent with a reference light having a frequency ($\omega_0+\delta$) which differs slightly from the modulation frequency of the scattered light ($\omega_0$), and extracts only the beat frequency components of the reference light and the signal.

8. The scanning near field optical microscope according to claim 4, the probe comprising a laser-trapped metallic particle, and generating plasmon resonance when light having a specific wavelength is illuminated thereto.

9. The scanning near field optical microscope according to claim 6, the probe comprising a laser-trapped metallic particle, and generating plasmon resonance when light having a specific wavelength is illuminated thereto.

10. The scanning near field optical microscope according to claim 4, the probe generating plasmon resonance when light having a specific wavelength is illuminated thereto.

11. The scanning near field optical microscope according to claim 4, the probe generating luminescence when light having a specific wavelength is illuminated thereto.

12. A near field optical microscope comprising:

a light illumination portion which illuminates light to the surface of a sample;

a probe having a tip smaller than the wavelength of light illuminated by the light illumination portion, the tip being provided near to the sample, and the tip thereof scattering the light;

a light detection portion which detects light scattered by the probe;

a displacement detection portion which detects the displacement of at least one of the probe and a supporting member which supports the probe;

a scanning portion which relatively scans the sample and the probe;

a controller which controls at least one of the distance between the probe and the sample, and the compressive force of the probe, based on a displacement detection signal from the displacement detection portion;

a signal capture portion which captures the displacement detection signal from the displacement detection portion;

an image formation portion which forms an image of a displacement detection signal captured by the signal capture portion; and a signal detection portion which, when characteristics of the sample surface change in accordance with the wavelength of the illumination light, periodically applies modulation to a signal generated by periodically modulating (modulation frequency $\omega_2$) the frequency (wavelength) of the light illuminated by the light illumination portion, and extracts only a modulation frequency component of a scatter signal.

13. The scanning near field optical microscope according to claim 12, a scattering body of the sample surface generating plasmon resonance at a specific wavelength.

14. The scanning near field optical microscope according to claim 12, luminescence generation of the sample surface having spatial distribution.

15. A near field optical microscope comprising:

light illumination means which illuminates light to the surface of a sample;

a probe having a tip provided near to the sample, the tip of the probe generating scattered light originating in light illuminated by the light illumination means;

light detection means which detects light scattered by the probe;

illumination light modulation means which modulates the wavelength of the light illuminated by the light illumination means at a predetermined frequency; and extraction means which extracts components at the predetermined frequency of the illumination light modulation means from an output of the light detection means.

16. A near field optical microscope comprising:

light illumination means which illuminates light to the surface of a sample;

a probe having a tip provided near to the sample, the tip of the probe generating scattered light originating in light illuminated by the light illumination means;

light detection means which detects light scattered by the probe;

illumination light modulation means which modulates the wavelength of the light illuminated by the light illumination means at a first frequency;

probe oscillation means which oscillates the probe at a second frequency; and extraction means which extracts a beat frequency component of the first frequency of the illumination light modulation means and the second frequency of the probe oscillation means from an output of the light detection means.

17. A near field optical microscope comprising:

light illumination means which illuminates light to the surface of a sample;

a probe having a tip provided near to the sample, the tip of the probe generating scattered light originating in light illuminated by the light illumination means;

light detection means which detects light scattered by the probe;

illumination light modulation means which modulates the wavelength of the light illuminated by the light illumination means at a first frequency;

coherence means which makes a reference light, at a frequency differing only by a frequency δ from the scattered light generated by the probe, coherent with the scattered light; and extraction means which extracts a beat frequency component of the first frequency of the illumination light modulation means and the frequency δ of the coherence means from an output of the light detection means.

18. A near field optical microscope comprising:

light illumination means which illuminates light to the surface of a sample;

a probe having a tip provided near to the sample, the tip of the probe generating scattered light originating in light illuminated by the light illumination means;

light detection means which detects light scattered by the probe;

illumination light modulation means which modulates the wavelength of the light illuminated by the light illumination means at a first frequency;

probe oscillation means which oscillates the probe at a second frequency;

coherence means which makes a reference light, at a frequency differing only by a frequency δ from the scattered light generated by the probe, coherent with the scattered light; and extraction means which extracts a beat frequency component of the first frequency of the illumination light modulation means and the frequency δ of the coherence means from an output of the light detection means.

19. A near field optical microscope comprising:

light illumination means which illuminates light to the surface of a sample;

a probe having a tip smaller than the wavelength of light illuminated by the light illumination means, the tip being provided near to the sample, and the tip thereof scattering the light;

light detection means which detects light scattered by the probe;

displacement detection means which detects the displacement of at least one of the probe and a supporting member which supports the probe;

scanning means which relatively scans the sample and the probe;

a controller which controls at least one of the distance between the probe and the sample, and the compressive force of the probe, based on a displacement detection signal from the displacement detection means;

signal capture means which captures the displacement detection signal from the displacement detection means;

image formation means which forms an image of a displacement detection signal captured by the signal capture means; and signal detection means which, when at least one of the scattered light from the tip of the probe and the generated light changes in accordance with the wavelength of the illumination light, periodically applies modulation to a signal generated by periodically modulating (modulation frequency $\omega_2$) the frequency (wavelength) of the light illuminated by the light illumination means, and extracts only the modulation frequency component of a scattered signal.

20. A near field optical microscope comprising:

light illumination means which illuminates light to the surface of a sample;

a probe having a tip smaller than the wavelength of light illuminated by the light illumination means, the tip being provided near to the sample, and the tip thereof scattering the light;

light detection means which detects light scattered by the probe;

displacement detection means which detects the displacement of at least one of the probe and a supporting member which supports the probe;

scanning means which relatively scans the sample and the probe;

a controller which controls at least one of the distance between the probe and the sample, and the compressive force of the probe, based on a displacement detection signal from the displacement detection means;

signal capture means which captures the displacement detection signal from the displacement detection means;

image formation means which forms an image of a displacement detection signal captured by the signal capture means; and signal detection means which, when at least one of the scattered light from the tip of the probe and the generated light changes in accordance with the wavelength of the illumination light, periodically applies modulation to a signal generated by periodically modulating (modulation frequency $\omega_2$) the frequency (wavelength) of the light illuminated by the light illumination means, oscillates the probe at a frequency ($\omega_1$) differing slightly from the modulation frequency of the wavelength of the illumination light, simultaneously applies the wavelength modulation of the illumination light and the modulation generated by oscillating the probe to a scatter signal, and extracts only the beat frequency components ($|\omega_2-\omega_1|$ and ($\omega_2+\omega_1$)) of both.

21. A near field optical microscope comprising:

light illumination means which illuminates light to the surface of a sample;

a probe having a tip smaller than the wavelength of light illuminated by the light illumination means, the tip being provided near to the sample, and the tip thereof scattering the light;

light detection means which detects light scattered by the probe;

displacement detection means which detects the displacement of at least one of the probe and a supporting member which supports the probe;

scanning means which relatively scans the sample and the probe;

a controller which controls at least one of the distance between the probe and the sample, and the compressive force of the probe, based on a displacement detection signal from the displacement detection means;

signal capture means which captures the displacement detection signal from the displacement detection means;

image formation means which forms an image of a displacement detection signal captured by the signal capture means; and signal detection means which, when at least one of the scattered light from the tip of the probe and the generated light changes in accordance with the wavelength of the illumination light, periodically applies modulation to a signal generated by periodically modulating (modulation frequency $\omega_2$) the frequency (wavelength) of the light illuminated by the light illumination means, makes the generated signal coherent with a reference light having a frequency ($\omega_0+\delta$) which differs slightly from the modulation frequency of the scattered light ($\omega_0$), and extracts only the beat frequency components ($|\omega_2-\delta|$ and ($\omega_2+\delta$)) of both.

22. A near field optical microscope comprising:

light illumination means which illuminates light to the surface of a sample;

a probe having a tip smaller than the wavelength of light illuminated by the light illumination means, the tip being provided near to the sample, and the tip thereof scattering the light;

light detection means which detects light scattered by the probe;

displacement detection means which detects the displacement of at least one of the probe and a supporting member which supports the probe;

scanning means which relatively scans the sample and the probe;

a controller which controls at least one of the distance between the probe and the sample, and the compressive force of the probe, based on a displacement detection signal from the displacement detection means;

signal capture means which captures the displacement detection signal from the displacement detection means;

image formation means which forms an image of a displacement detection signal captured by the signal capture means; and signal detection means which, when at least one of the scattered light from the tip of the probe and the generated light changes in accordance with the wavelength of the illumination light, periodically applies modulation to a signal generated by periodically modulating (modulation frequency $\omega_2$) the frequency (wavelength) of the light illuminated by the light illumination means, simultaneously applies the wavelength modulation of the illumination light and the modulation generated by oscillating the probe to a scattered signal, makes the generated signal coherent with a reference light having a frequency ($\omega_0+\delta$) which differs slightly from the modulation frequency of the scattered light ($\omega_0$), and extracts only the beat frequency components of the reference light and the signal.

23. A near field optical microscope comprising:

light illumination means which illuminates light to the surface of a sample;

a probe having a tip smaller than the wavelength of light illuminated by the light illumination means, the tip being provided near to the sample, and the tip thereof scattering the light;

light detection means which detects light scattered by the probe;

displacement detection means which detects the displacement of at least one of the probe and a supporting member which supports the probe;

scanning means which relatively scans the sample and the probe;

a controller which controls at least one of the distance between the probe and the sample, and the compressive force of the probe, based on a displacement detection signal from the displacement detection means;

signal capture means which captures the displacement detection signal from the displacement detection means;

image formation means which forms an image of a displacement detection signal captured by the signal capture means; and signal detection means which, when characteristics of the sample surface change in accordance with the wavelength of the illumination light, periodically applies modulation to a signal generated by periodically modulating (modulation frequency $\omega_2$) the frequency (wavelength) of the light illuminated by the light illumination means, and extracts only a modulation frequency component of a scatter signal.

* * * * *